United States Patent [19]
Aoki

[11] Patent Number: 5,196,962
[45] Date of Patent: Mar. 23, 1993

[54] VARI-FOCAL LENS SYSTEM

[75] Inventor: Norihiko Aoki, Tokyo, Japan

[73] Assignee: Olympus Optical Co., Ltd., Tokyo, Japan

[21] Appl. No.: 726,999

[22] Filed: Jul. 8, 1991

[30] Foreign Application Priority Data

Jul. 9, 1990 [JP] Japan .................. 2-179583

[51] Int. Cl.$^5$ .......................................... G02B 15/14
[52] U.S. Cl. ..................................... 359/686; 359/654; 359/689
[58] Field of Search ..................... 350/413, 423, 427; 359/654, 686, 689

[56] References Cited

U.S. PATENT DOCUMENTS

| | | | |
|---|---|---|---|
| 4,673,258 | 6/1987 | Masumoto | 359/686 |
| 4,726,668 | 2/1988 | Nakayama et al. | 359/689 |
| 4,840,467 | 6/1989 | Takada et al. | 350/413 X |
| 4,952,038 | 8/1990 | Ito | 359/689 |

FOREIGN PATENT DOCUMENTS

| | | |
|---|---|---|
| 61-126515 | 6/1986 | Japan . |
| 61-148414 | 7/1986 | Japan . |
| 63-43115 | 2/1988 | Japan . |
| 63-159818 | 7/1988 | Japan . |
| 63-161423 | 7/1988 | Japan . |
| 1-252916 | 10/1989 | Japan . |

Primary Examiner—Scott J. Sugarman
Attorney, Agent, or Firm—Cushman, Darby & Cushman

[57] ABSTRACT

A compact vari-focal lens system comprising, in the order from the object side, a first lens unit having a positive refractive power, a second lens unit having a positive refractive power and a third lens unit having a negative refractive power, and uses at least one radial type graded refractive index lens element arranged at the image side location in the second lens unit. The varifocal lens system has a high vari-focal ratio and aberrations corrected favorably over the entire varifocal range from the wide position to the tele position, and consists of a very small number of lens elements.

32 Claims, 15 Drawing Sheets

VARI-FOCAL LENS SYSTEM

BACKGROUND OF THE INVENTION a) Field of the invention

The present invention relates to a compact vari-focal lens system for lens shutter cameras which comprises a small number of lens elements and has a high vari-focal ratio.

b) Description of the prior art

In the recent years, the prevalence of compact cameras has produced demands for vari-focal lens systems which are compact, light in weight and have high-grade specifications. Especially for use with the lens shutter cameras which do not permit exchange of lens systems, it is demanded to develop compact vari-focal lens systems having vari-focal ratios of 2 and higher.

As a vari-focal lens system which is designed so as to satisfy the demand for compact and light-weight design, there is already known a lens system which consists of a front lens unit having a positive refractive power and a rear lens unit having a negative refractive power, and is adapted so as to perform variation of focal length by varying the airspace reserved between these two lens units. However, it is difficult to design this vari-focal lens system so as to have a vari-focal ratio of 2 or higher and high-grade specifications since the focal length of this lens system is varied by moving the rear lens unit which has a magnification higher than 1× and the negative refractive power.

As vari-focal lens systems which have solved this problem or are designed so as to have high vari-focal ratios, there are known the lens systems disclosed by Japanese Patent Kokai Publication No. Sho 63-43115 and Japanese Patent Kokai Publication No. Hei 1-252916. Each of these vari-focal lens systems consists, in the order from the object side, of three positive, positive and negative lens units or four positive, negative, positive and negative lens units, and has a vari-focal ratio on the order of 3. However, this vari-focal lens system comprises at least eleven lens elements even when aspherical surfaces are used therein and is not sufficiently satisfactory from the viewpoint of compact and lightweight design.

On the other hand, attentions are now paid to the lens systems which adopt graded refractive index lens elements. Graded refractive index lens elements are classified, dependently on directions of refractive index distributions, into the axial type which has a refractive index distribution in the direction along the optical axis, the radial type which has a refractive index distribution in the direction perpendicular to the optical axis, and so on. Especially the radial type graded refractive index lens element is expected to exhibit an effect to make lens systems compacter and lighter in weight.

The lens systems disclosed by Japanese Patent Kokai Publication No. Sho 63-159818 and Japanese Patent Kokai Publication No. Sho 63-161423 are known as the vari-focal lens systems for lens shutter cameras having vari-focal ratios of approximately 3 and using graded refractive index lens elements. Each of these lens systems is designed so as to suppress variations of aberrations during variation of focal lengths by using the axial type graded refractive index lens element, but comprises eleven lens elements and is not sufficiently satisfactory from the viewpoint of the compact and lightweight design.

Further, the lens systems disclosed by Japanese Patent Kokai Publication No. Sho 61-126515, Japanese Patent Kokai Publication No. Sho 61-148414 and so on are vari-focal lens systems for lens shutter cameras using the radial type graded refractive index lens elements and comprising lens elements in small numbers, the minimum of which is only five. However, these lens systems have low vari-focal ratios of 1.5 to 2 and are still unsatisfactory from the viewpoint of the high-grade specifications.

SUMMARY OF THE INVENTION

A primary object of the present invention is to provide a vari-focal lens system which has a vari-focal ratio as high as 3, aberrations corrected sufficiently favorably over the entire vari-focal range from the wide position to the tele position, a short total length and a composition consisting of a very small number of lens elements.

The vari-focal lens system according to the present invention comprises, in the order from the object side, a first lens unit having a positive refractive power, a second lens unit having a positive refractive power and a third lens unit having a negative refractive power, and uses in said second lens unit at least one graded refractive index lens element which has a refractive index distribution in the direction perpendicular to the optical axis (radial type GRIN lens element).

For the vari-focal lens system according to the present invention, it is desirable to design the second lens unit so as to comprise, in the order from the object side, at least a lens element having a negative refractive power and a lens element having a positive refractive power, and have a positive refractive power as a whole.

Since rays can be refracted in the diverging directions by arranging the lens element having the negative refractive power at the object side location in the second lens unit as described above and the focal length of the vari-focal lens system, especially at the tele position thereof, can be prolonged by designing the lens system so as to perform variation of focal length by moving the individual lens units independently, it is possible to obtain a lens system having a high vari-focal ratio. Further, it is effective for shortening the total length of the vari-focal lens system to select the telephoto type power distribution. For this reason, the lens unit having the negative refractive power is arranged at the image side location in the vari-focal lens system according to the present invention.

By composing the vari-focal lens system according to the present invention as described above, it is possible to enhance the vari-focal ratio of the lens system and shorten the total length thereof to a certain degree. However, the vari-focal lens system currently having the simplest composition and consisting only of homogenous lens elements comprises eleven lens elements even when aspherical surfaces are used therein and it is very difficult to reduce the number of the lens elements to ⅔ thereof or so.

The present invention has succeeded in remarkably reducing the number of the lens elements by using, in the vari-focal lens system, at least one radial GRIN lens element which has a refractive index distribution in the direction perpendicular to the optical axis.

The radial type GRIN lens element used in the vari-focal lens system according to the present invention has a refractive index distribution for the ray having the standard wavelength which is expressed by the formula shown below:

$$n(r) = N_0 + N_1 r^2 + N_2 r^4 + N_3 r^6 + \ldots$$

wherein the reference symbol $N_0$ represents the refractive index for the ray having the standard wavelength of the radial GRIN lens element as measured on the optical axis, the reference symbol r designates the distance as measured from the optical axis to a portion of interest of the radial GRIN lens element in the radial direction, the reference symbol n(r) denotes the refractive index for the ray having the standard wavelength as measured at the portion located at the distance r, and the reference symbols $N_1$, $N_2$, $N_3$, ... represent the refractive index distribution coefficients of the second, fourth, sixth, ... orders respectively for the ray having the standard wavelength.

Since the GRIN lens element has a refractive power also of the medium thereof, it is possible, by imparting a refractive power of surface and a refractive power of medium which have the same sign, to equalize the total refractive power of the GRIN lens element to that of a homogenous lens element even when the GRIN lens element has a curvature on the surface thereof which is lower than that on the surface of the homogenous lens element.

Further, the refractive power of the medium of the GRIN lens element is dependent mainly on the coefficient of the second order $N_1$ and the thickness of the GRIN lens element as measured on the optical axis. Since the refractive power of the medium acts as a negative power when the coefficient $N_1$ is positive or acts as positive power when the coefficient $N_1$ is negative, it is possible to control the refractive power of the GRIN lens element by both the surface and the medium thereof so as to enhance the freedom for correction of aberrations and reduce the number of the lens elements required for composing the lens system.

Furthermore, since the GRIN lens element has the refractive power of the medium thereof, it is usable for correcting Petzval's sum which cannot be corrected with aspherical surfaces.

The Petzval's sum of the GRIN lens element, considered independently of the lens system, is expressed by the following formula:

$$\phi_S/N_0 + \phi_M/N_0^2$$

wherein the reference symbol $\phi_S$ represents the refractive power of the surface of the GRIN lens element and the reference symbol $\phi_M$ designates the refractive power of the medium of the GRIN lens element.

As is clear from the formula mentioned above, the GRIN lens element permits adjusting Petzval's sume with a certain degree of freedom by controlling the refractive power of the surface and the refractive power of the medium thereof. By using the GRIN lens element in the vari-focal lens system according to the present invention, it is therefore possible to favorably correct the Petzval's sum of the lens system even when it is composed of a reduced number of lens elements.

Moreover, when the GRIN lens element has refractive index distributions of both the medium and the surface thereof, it permits correcting aberrations with the correction terms of the surface which have behaviors different from those of a homogenous lens element, thereby making it possible to further improve optical performance of the vari-focal lens system.

Since the refractive power of the GRIN lens element can be shared with the medium thereof as described above, it is effective to use the GRIN lens element in a lens unit which has an especially strong refractive power. For this reason, the present invention uses at least one GRIN lens element in the second positive lens unit which has the strongest refractive power in the vari-focal lens system.

The present invention has succeeded in obtaining a vari-focal lens system which has a high vari-focal ratio and has a short total length by selecting the composition described above, and remarkably reducing the number of lens elements while maintaining the favorable optical performance of the lens system by using the GRIN lens element in the second lens unit having the strongest refractive power.

For the vari-focal lens system according to the present invention described above, it is desirable to design the GRIN lens element to be arranged in the second lens unit so as to satisfy the following condition (1):

$$N_{1(2)} < 0 \tag{1}$$

wherein the reference symbol $N_{1(2)}$ represents the refractive index distribution coefficient of the second order of the GRIN lens element.

When two or more GRIN lens elements are to be used in the second lens unit, it is sufficient that at least one of the GRIN lens element satisfies the abovementioned condition (1). The condition (1) defines the refractive power of the medium of the GRIN lens element and means that the medium is to have a positive refractive power. When the GRIN lens element is designed so as to satisfy the condition (1), the positive refractive power required for the second lens unit can be shared with the medium of the GRIN lens element and Petzval's sum can be reduced, whereby the use of the GRIN lens element makes it possible to reduce the number of lens elements required to compose the vari-focal lens system.

If the upper limit of the condition (1) is exceeded, the medium of the GRIN lens element will have a negative refractive power. Accordingly, it will be necessary to strengthen the refractive powers of the homogenous lens elements for obtaining the positive refractive power required for the second lens unit, thereby making it impossible to reduce the number of the lens elements required to compose the vari-focal lens system.

The GRIN lens element which is designed so as to satisfy the condition (1) may be arranged at any location in the second lens unit, but should desirably be arranged at the image side location for allowing the effect of the GRIN lens element to be exhibited sufficiently. In order to enhance the vari-focal ratio of the lens system according to the present invention, rays must be refracted by the second lens unit in the diverging directions so that the rays are high on the lens elements arranged on the image side of the second lens unit. In addition, the marginal ray has a large angle of refraction on the lens elements arranged on the image side of the second lens unit at the wide position. It is therefore most effective for correction of spherical aberration to arrange the GRIN lens element at the image side location in the second lens unit as described above.

When the GRIN lens element is arranged at the image side location in the second lens unit as described above, it is desirable that the GRIN lens element satisfies the following condition (2):

$$K \cdot N_{2(1)} < 0 \qquad (2)$$

wherein the reference symbol $N_{2(1)}$ represents the refractive index distribution coefficient of the fourth order of the GRIN lens element arranged at the image side location in the second lens unit, and the reference symbol k designates a constant having a value of +1 when the either of the surfaces of the GRIN lens element whichever has the higher curvature is convex or a value of −1 when either of the surfaces of the GRIN lens element whichever has the higher curvature is concave.

The condition (2) is required for imparting to the GRIN lens element a refractive index distribution which is effective for correcting especially spherical aberration when the GRIN lens element is arranged at the most image side location in the second lens unit.

The GRIN lens element can correct aberrations with the surface, the medium and the correction term of the refractive index distribution imparted to the surface having a behavior different from that of a homogenous lens element. The condition (2) is required for determining the sign of the spherical aberration to be produced by the medium of the GRIN lens element and is adopted for favorably correcting aberrations in the vari-focal lens system as a whole.

The vari-focal lens system according to the present invention as a whole produces spherical aberration on the negative side over the entire vari-focal range from the wide position to the tele position. When the GRIN lens element is to be arranged at the image side location in the second lens unit for correcting the spherical aberration, the GRIN lens element is designed so as to satisfy the condition (1) or have a positive refractive power. When the constant k has a value of +1, i.e., when either of the surfaces of the GRIN lens element whichever has the higher curvature is convex, negative spherical aberration is produced by the surface of the GRIN lens element and positive spherical aberration is produced by the correction terms of the refractive index distribution imparted to the surface having a behavior different from that of a homogenous lens element. However, since the number of the lens elements is reduced and the positive refractive power of the second lens element is shared with the medium of the GRIN lens element in the vari-focal lens system, the positive spherical aberration produced by the above-mentioned correction terms is predominant, thereby causing overcorrection of spherical aberration in the vari-focal lens system as a whole. Therefore, it is desirable that the GRIN lens element satisfies the condition (2) so as to produce negative spherical aberration by the medium thereof, whereby the spherical aberration is corrected favorably in the vari-focal lens system as a whole.

Further, when the constant k has a value of −1, i.e., when either of the surface of the GRIN lens element whichever has the higher curvature is concave, positive spherical aberration is produced by the surface of the GRIN lens element and negative spherical aberration is produced by the correction terms of said surface. Therefore, the spherical aberration can be corrected favorably in the vari-focal lens system as a whole when the GRIN lens element is designed so as to satisfy the condition (2) or produce positive spherical aberration by the medium thereof.

If the upper limit of the condition (2) is exceeded, the spherical aberration will be unbalanced or cannot be corrected favorably in the vari-focal lens system as a whole.

In addition, in the second lens unit of the vari-focal lens system according to the present invention, the object side surface of the negative lens element arranged at the object side location is concave toward the object side to enhance the vari-focal ratio of the vari-focal lens system and correct the spherical aberration in the lens system as a whole which is apt to be produced on the negative side.

In the vari-focal lens system according to the present invention which is composed of the three lens units as described above, the second lens unit having the positive refractive power may be divided into an object side lens unit having a negative refractive power and an image side lens unit having a positive lens unit so that the vari-focal lens system is composed of four lens units. Speaking more concretely, the vari-focal lens system according to the present invention may comprise a first lens unit having a positive refractive power, a second lens unit having a negative refractive power, a third lens unit having a positive refractive power and a fourth lens unit having a negative refractive power.

For the vari-focal lens system which comprises the four lens units as described above, it is sufficient to use at least one radial GRIN lens element in the third lens unit having the positive refractive power.

DETAILED DESCRIPTION OF THE PREFERRED EMBODIMENTS

Figure 1:
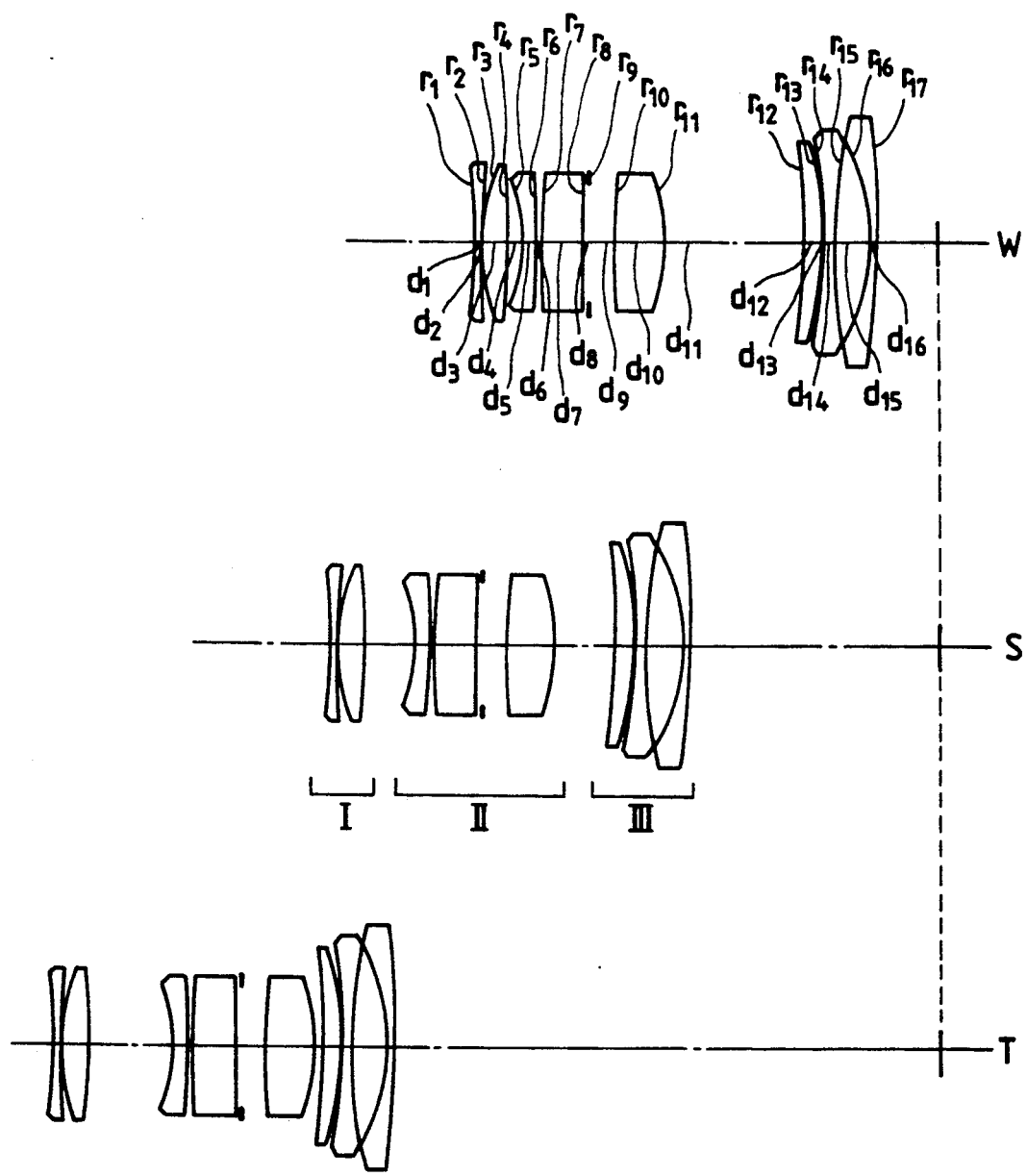
FIG. 1 through FIG. 6 show sectional views illustrating compositions of Embodiments 1 through 6 respectively of the vari-focal lens system according to the present invention.

Now, the vari-focal lens system according to the present invention will be described more detailedly below with reference to the preferred embodiments illustrated in the accompanying drawings and given in the form of the following numerical data:

Embodiment 1

-continued $f = 35 \sim 105$ mm, $\quad$ F/4.5~F/6.5
$2\omega = 62.8° \sim 23.8°$

| | | | |
|---|---|---|---|
| $r_1 = -82.8124$ | | | |
| | $d_1 = 1.0000$ | $n_1 = 1.83400$ | $\nu_1 = 37.16$ |
| $r_2 = 142.5629$ | | | |
| | $d_2 = 0.1200$ | | |
| $r_3 = 28.1579$ | | | |
| | $d_3 = 3.1200$ | $n_2 = 1.65160$ | $\nu_2 = 58.52$ |
| $r_4 = -71.3782$ | | | |
| | $d_4 = D_1$ (variable) | | |
| $r_5 = -20.6631$ | | | |
| | $d_5 = 1.7665$ | $n_3 = 1.77250$ | $\nu_3 = 49.66$ |
| $r_6 = -185.0591$ | | | |
| | $d_6 = 0.5056$ | | |
| $r_7 = 123.4202$ | | | |
| | $d_7 = 5.1610$ | $n_4 = 1.84666$ | $\nu_4 = 23.78$ |
| $r_8 = -254.9242$ | | | |
| | $d_8 = 0.5079$ | | |
| $r_9 = \infty$ (stop) | | | |
| | $d_9 = 2.9876$ | | |
| $r_{10} = 79.1022$ | | | |
| | $d_{10} = 6.0190$ | $n_5$ (GRIN lens) | |
| $r_{11} = -24.4531$ | | | |
| | $d_{11} = D_2$ (variable) | | |
| $r_{12} = -89.5236$ | | | |
| | $d_{12} = 2.3072$ | $n_6 = 1.80518$ | $\nu_6 = 25.43$ |
| $r_{13} = -37.1796$ | | | |
| | $d_{13} = 0.1500$ | | |
| $r_{14} = -58.1985$ | | | |
| | $d_{14} = 1.0017$ | $n_7 = 1.69680$ | $\nu_7 = 56.49$ |
| $r_{15} = 64.5623$ | | | |
| | $d_{15} = 4.5021$ | | |
| $r_{16} = 23.3155$ | | | |
| | $d_{16} = 1.0011$ | $n_8 = 1.72916$ | $\nu_8 = 54.68$ |
| $r_{17} = -92.8175$ | | | |

| | | | |
|---|---|---|---|
| f | 36.2 | 60.5 | 101.1 |
| $D_1$ | 1.501 | 6.090 | 9.989 |
| $D_2$ | 16.147 | 7.174 | 1.104 |

GRIN lens

| | $N_0$ | $N_1$ |
|---|---|---|
| d line | 1.60729, | $-0.70698 \times 10^{-3}$ |
| C line | 1.60425, | $-0.71533 \times 10^{-3}$ |
| F line | 1.61448, | $-0.68750 \times 10^{-3}$ |

| | $N_2$ |
|---|---|
| d line | $-0.36536 \times 10^{-6}$ |
| C line | $-0.44967 \times 10^{-6}$ |
| F line | $-0.16863 \times 10^{-6}$ |

$N_{1(2)} = -0.70698 \times 10^{-3}$
$K \cdot N_{2(1)} = -0.36536 \times 10^{-6}$ Embodiment 2

$f = 35 \sim 105$ mm, $\quad$ F/4.5~F/6.5
$2\omega = 61.8° \sim 23.8°$

| | | | |
|---|---|---|---|
| $r_1 = 211.6243$ | | | |
| | $d_1 = 1.0000$ | $n_1 = 1.83400$ | $\nu_1 = 37.16$ |
| $r_2 = 46.8544$ | | | |
| | $d_2 = 0.1200$ | | |
| $r_3 = 22.0690$ | | | |
| | $d_3 = 3.2057$ | $n_2 = 1.61700$ | $\nu_2 = 62.79$ |
| $r_4 = -116.7022$ | | | |
| | $d_4 = D_1$ (variable) | | |
| $r_5 = -17.8856$ | | | |
| | $d_5 = 7.6485$ | $n_3$ (GRIN lens 1) | |
| $r_6 = -388.0124$ | | | |
| | $d_6 = 0.8632$ | | |
| $r_7 = \infty$ (stop) | | | |
| | $d_7 = 0.8967$ | | |
| $r_8 = 57.8611$ | | | |
| | $d_8 = 3.7235$ | $n_4$ (GRIN lens 2) | |
| $r_9 = -17.2617$ | | | |
| | $d_9 = D_2$ (variable) | | |
| $r_{10} = -88.8573$ | | | |
| | $d_{10} = 3.0258$ | $n_5 = 1.76182$ | $\nu_5 = 26.55$ |
| $r_{11} = -37.2598$ | | | |
| | $d_{11} = 0.1572$ | | |
| $r_{12} = -63.3184$ | | | |
| | $d_{12} = 1.0017$ | $n_6 = 1.69680$ | $\nu_6 = 56.49$ |
| $r_{13} = 88.8136$ | | | |
| | $d_{13} = 4.8000$ | | |
| $r_{14} = -21.9171$ | | | |
| | $d_{14} = 1.0011$ | $n_7 = 1.72916$ | $\nu_7 = 54.68$ |
| $r_{15} = -104.0855$ | | | |

| | | | |
|---|---|---|---|
| f | 36.2 | 60.5 | 101.2 |
| $D_1$ | 1.550 | 5.369 | 9.355 |
| $D_2$ | 17.058 | 7.688 | 1.200 |

GRIN lens 1

| | $N_0$ | $N_1$ |
|---|---|---|
| d line | 1.77250, | $-0.15036 \times 10^{-3}$ |
| C line | 1.76780, | $-0.14426 \times 10^{-3}$ |
| F line | 1.78336, | $-0.16458 \times 10^{-3}$ |

| | $N_2$ |
|---|---|
| d line | $-0.17762 \times 10^{-5}$ |
| C line | $-0.16430 \times 10^{-5}$ |
| F line | $-0.20870 \times 10^{-5}$ |

GRIN lens 2

| | $N_0$ | $N_1$ |
|---|---|---|
| d line | 1.60729, | $-0.57582 \times 10^{-3}$ |
| C line | 1.60418, | $-0.59022 \times 10^{-3}$ |
| F line | 1.61441, | $-0.54223 \times 10^{-3}$ |

| | $N_2$ |
|---|---|
| d line | $-0.31558 \times 10^{-6}$ |
| C line | $-0.34343 \times 10^{-6}$ |
| F line | $-0.25061 \times 10^{-6}$ |

$N_{1(2)} = -0.15036 \times 10^{-3}$ (GRIN lens 1)
$N_{1(2)} = -0.57582 \times 10^{-3}$ (GRIN lens 2)
$K \cdot N_{2(1)} = -0.31558 \times 10^{-6}$ Embodiment 3

$f = 35 \sim 105$ mm, $\quad$ F/4.5~F/6.5
$2\omega = 61.8° \sim 24.2°$

| | | | |
|---|---|---|---|
| $r_1 = 479.0916$ | | | |
| | $d_1 = 0.9060$ | $n_1 = 1.85026$ | $\nu_1 = 32.28$ |
| $r_2 = 62.8896$ | | | |
| | $d_2 = 0.1200$ | | |
| $r_3 = 24.5476$ | | | |
| | $d_3 = 3.0039$ | $n_2 = 1.61700$ | $\nu_2 = 62.79$ |
| $r_4 = -142.6960$ | | | |
| | $d_4 = D_1$ (variable) | | |
| $r_5 = -20.2579$ | | | |
| | $d_5 = 8.6330$ | $n_3$ (GRIN lens 1) | |
| $r_6 = -123.3366$ | | | |
| | $d_6 = 0.5113$ | | |
| $r_7 = \infty$ (stop) | | | |
| | $d_7 = 1.6204$ | | |
| $r_8 = 65.5250$ | | | |
| | $d_8 = 5.3893$ | $n_4$ (GRIN lens 2) | |
| $r_9 = -25.6373$ | | | |
| | $d_9 = D_2$ (variable) | | |
| $r_{10} = -24.6203$ | | | |
| | $d_{10} = 3.4433$ | $n_5 = 1.80518$ | $\nu_5 = 25.43$ |
| $r_{11} = -18.4364$ | | | |
| | $d_{11} = 2.3876$ | | |
| $r_{12} = -18.3338$ | | | |
| | $d_{12} = 1.7003$ | $n_6 = 1.77250$ | $\nu_6 = 49.66$ |
| $r_{13} = -7442.4481$ | | | |

| | | | |
|---|---|---|---|
| f | 36.2 | 60.5 | 101.1 |
| $D_1$ | 1.349 | 6.162 | 11.259 |
| $D_2$ | 19.754 | 8.789 | 1.125 |

GRIN lens 1

| | $N_0$ | $N_1$ |
|---|---|---|
| d line | 1.77250, | $-0.11630 \times 10^{-3}$ |
| C line | 1.76780, | $-0.10633 \times 10^{-3}$ |
| F line | 1.78336, | $-0.13955 \times 10^{-3}$ |

| | $N_2$ |
|---|---|
| d line | $-0.23605 \times 10^{-6}$ |
| C line | $-0.30687 \times 10^{-6}$ |
| F line | $-0.70815 \times 10^{-7}$ |

GRIN lens 2

| | $N_0$ | $N_1$ |
|---|---|---|
| d line | 1.60729, | $-0.93189 \times 10^{-3}$ |
| C line | 1.60418, | $-1.60418 \times 10^{-3}$ |
| F line | 1.61441, | $-0.90083 \times 10^{-3}$ |

| | $N_2$ |
|---|---|
| d line | $-0.20954 \times 10^{-5}$ |

-continued

```
            C line      -0.21478 × 10⁻⁵
            F line      -0.19732 × 10⁻⁵
N₁(2) = -0.11630 × 10⁻³ (GRIN lens 1)
N₁(2) = -0.93189 × 10⁻³ (GRIN lens 2)
K · N₂(1) = -0.20954 × 10⁻⁵
```

Embodiment 4

$f = 35 \sim 105$ mm,  F/4.5~F/6.5
$2\omega = 61.8° \sim 24.2°$

| | | | |
|---|---|---|---|
| $r_1 = -1911.4184$ | | | |
| | $d_1 = 1.0000$ | $n_1 = 1.85026$ | $\nu_1 = 32.28$ |
| $r_2 = 60.9501$ | | | |
| | $d_2 = 0.1200$ | | |
| $r_3 = 22.7908$ | | | |
| | $d_3 = 2.9203$ | $n_2 = 1.69680$ | $\nu_2 = 56.49$ |
| $r_4 = -213.5384$ | | | |
| | $d_4 = D_1$ (variable) | | |
| $r_5 = -19.1242$ | | | |
| | $d_5 = 2.4422$ | $n_3$ (GRIN lens 1) | |
| $r_6 = -96.2459$ | | | |
| | $d_6 = 0.7132$ | | |
| $r_7 = \infty$ (stop) | | | |
| | $d_7 = 1.9319$ | | |
| $r_8 = 188.2584$ | | | |
| | $d_8 = 6.4054$ | $n_4$ (GRIN lens 2) | |
| $r_9 = -18.7161$ | | | |
| | $d_9 = D_2$ (variable) | | |
| $r_{10} = -18.0399$ | | | |
| | $d_{10} = 2.5828$ | $n_5 = 1.84666$ | $\nu_5 = 23.78$ |
| $r_{11} = -16.1038$ | | | |
| | $d_{11} = 1.7151$ | | |
| $r_{12} = -18.6077$ | | | |
| | $d_{12} = 1.4123$ | $n_6 = 1.69680$ | $\nu_6 = 56.49$ |
| $r_{13} = -1033.1754$ | | | |
| f | 36.2 | 60.5 | 101.1 |
| $D_1$ | 1.349 | 6.469 | 11.685 |
| $D_2$ | 20.218 | 9.083 | 1.125 |

GRIN lens 1

| | $N_0$ | $N_1$ |
|---|---|---|
| d line | 1.78590, | 0.20685 × 10⁻³ |
| C line | 1.78059, | 0.23788 × 10⁻³ |
| F line | 1.79837, | 0.13445 × 10⁻³ |
| | $N_2$ | |
| d line | 0.12458 × 10⁻⁵ | |
| C line | 0.97884 × 10⁻⁶ | |
| F line | 0.18687 × 10⁻⁵ | |

GRIN lens 2

| | $N_0$ | $N_1$ |
|---|---|---|
| d line | 1.60729, | -0.88234 × 10⁻³ |
| C line | 1.60418, | -0.89125 × 10⁻³ |
| F line | 1.61441, | -0.86154 × 10⁻³ |
| | $N_2$ | |
| d line | -0.14584 × 10⁻⁵ | |
| C line | -0.15556 × 10⁻⁵ | |
| F line | -0.12315 × 10⁻⁵ | |

$N_{1(2)} = -0.88234 \times 10^{-3}$
$K \cdot N_{2(1)} = -0.14584 \times 10^{-5}$

Embodiment 5

$f = 35 \sim 105$ mm,  F/4.5~F/6.5
$2\omega = 61.8° \sim 24.2°$

| | | | |
|---|---|---|---|
| $r_1 = 943.2571$ | | | |
| | $d_1 = 0.9060$ | $n_1 = 1.84666$ | $\nu_1 = 23.78$ |
| $r_2 = 74.9401$ | | | |
| | $d_2 = 0.1200$ | | |
| $r_3 = 19.6655$ | | | |
| | $d_3 = 3.0039$ | $n_2 = 1.69680$ | $\nu_2 = 56.49$ |
| $r_4 = 106.6352$ | | | |
| | $d_4 = D_1$ (variable) | | |
| $r_5 = -33.6973$ | | | |
| | $d_5 = 4.9412$ | $n_3$ (GRIN lens 1) | |
| $r_6 = -541.0911$ | | | |
| | $d_6 = 0.5113$ | | |
| $r_7 = \infty$ (stop) | | | |
| | $d_7 = 1.9941$ | | |
| $r_8 = 159.8040$ | | | |
| | $d_8 = 6.8298$ | $n_4$ (GRIN lens 2) | |
| $r_9 = -19.9268$ | | | |
| | $d_9 = D_2$ (variable) | | |
| $r_{10} = -18.1090$ (aspherical surface) | | | |
| | $d_{10} = 3.7460$ | $n_5 = 1.84666$ | $\nu_5 = 23.78$ |
| $r_{11} = -17.3972$ | | | |
| | $d_{11} = 2.2430$ | | |
| $r_{12} = -15.2734$ | | | |
| | $d_{12} = 1.5387$ | $n_6 = 1.69680$ | $\nu_6 = 56.49$ |
| $r_{13} = -148.0065$ | | | |
| f | 36.2 | 60.5 | 101.1 |
| $D_1$ | 1.349 | 7.157 | 11.821 |
| $D_2$ | 15.320 | 7.051 | 1.125 | aspherical surface coefficeint
$P = 1$, $A_4 = 0.20309 \times 10^{-4}$
$A_6 = 0.12986 \times 10^{-6}$, $A_8 = -0.11550 \times 10^{-8}$
$A_{10} = 0.69082 \times 10^{-11}$ GRIN lens 1

| | $N_0$ | $N_1$ |
|---|---|---|
| d line | 1.78590, | 0.20939 × 10⁻³ |
| C line | 1.78059, | 0.22665 × 10⁻³ |
| F line | 1.79837, | 0.16912 × 10⁻³ |
| | $N_2$ | |
| d line | 0.55808 × 10⁻⁵ | |
| C line | 0.54936 × 10⁻⁵ | |
| F line | 0.57843 × 10⁻⁵ | |

GRIN lens 2

| | $N_0$ | $N_1$ |
|---|---|---|
| d line | 1.60729, | -0.75272 × 10⁻³ |
| C line | 1.60418, | -0.76096 × 10⁻³ |
| F line | 1.61441, | -0.73349 × 10⁻³ |
| | $N_2$ | |
| d line | -0.234447 × 10⁻⁵ | |
| C line | -0.24361 × 10⁻⁵ | |
| F line | -0.21315 × 10⁻⁵ | |

$N_{1(2)} = -0.75272 \times 10^{-3}$
$K \cdot N_{2(1)} = -0.23447 \times 10^{-5}$

Embodiment 6

$f = 35 \sim 105$ mm,  F/4.5~F/6.5
$2\omega = 61.8° \sim 24.2°$

| | | | |
|---|---|---|---|
| $r_1 = -4346.0327$ | | | |
| | $d_1 = 1.0000$ | $n_1 = 1.85026$ | $\nu_1 = 32.28$ |
| $r_2 = 62.3955$ | | | |
| | $d_2 = 0.1200$ | | |
| $r_3 = 20.5429$ | | | |
| | $d_3 = 2.9203$ | $n_2 = 1.69680$ | $\nu_2 = 56.49$ |
| $r_4 = -1500.3464$ | | | |
| | $d_4 = D_1$ (variable) | | |
| $r_5 = -18.6204$ | | | |
| | $d_5 = 1.6757$ | $n_3$ (GRIN lens 1) | |
| $r_6 = -51.5666$ | | | |
| | $d_6 = D_2$ (variable) | | |
| $r_7 = \infty$ (stop) | | | |
| | $d_7 = 1.8565$ | | |
| $r_8 = 11621.8599$ | | | |
| | $d_8 = 6.1924$ | $n_4$ (GRIN lens 2) | |
| $r_9 = -19.4997$ | | | |
| | $d_9 = D_2$ (variable) | | |
| $r_{10} = -17.0949$ | | | |
| | $d_{10} = 2.3098$ | $n_5 = 1.84666$ | $\nu_5 = 23.78$ |
| $r_{11} = -15.9798$ | | | |
| | $d_{11} = 1.3292$ | | |
| $r_{12} = -18.8436$ | | | |
| | $d_{12} = 1.4123$ | $n_6 = 1.69680$ | $\nu_6 = 56.49$ |
| $r_{13} = 6132.4348$ | | | |
| f | 36.2 | 60.5 | 101.1 |
| $D_1$ | 1.349 | 5.843 | 11.484 |
| $D_2$ | 1.000 | 0.800 | 0.500 |
| $D_3$ | 18.835 | 8.672 | 1.121 |

GRIN lens 1

| | $N_0$ | $N_1$ |
|---|---|---|
| d line | 1.78590, | 0.20349 × 10⁻³ |
| C line | 1.78059, | 0.21249 × 10⁻³ |
| F line | 1.79837, | 0.18248 × 10⁻³ |

-continued

| | $N_2$ | |
|---|---|---|
| d line | $0.23521 \times 10^{-7}$ | |
| C line | $-0.77283 \times 10^{-7}$ | |
| F line | $0.25873 \times 10^{-6}$ | |

GRIN lens 2

| | $N_0$ | $N_1$ |
|---|---|---|
| d line | 1.60729, | $-0.90307 \times 10^{-3}$ |
| C line | 1.60418, | $-0.90310 \times 10^{-3}$ |
| F line | 1.61441, | $-0.90301 \times 10^{-3}$ |

| | $N_2$ | |
|---|---|---|
| d line | $-0.71089 \times 10^{-6}$ | |
| C line | $-0.77362 \times 10^{-6}$ | |
| F line | $-0.56453 \times 10^{-6}$ | |

$N_{1(2)} = -0.90307 \times 10^{-3}$
$K \cdot N_{2(1)} = -0.71089 \times 10^{-6}$ wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

The Embodiment 1 has the composition illustrated in FIG. 1, wherein the vari-focal lens system according to the present invention comprises, in the order from the object side, a first lens unit I having a positive refractive power, a second lens unit II having a positive refractive power and a third lens unit III having a negative refractive power, and the lens element arranged at the image side location in the second lens unit is designed as the GRIN lens element satisfying the conditions (1) and (2).

Owing to the adoption of the composition and the GRIN lens element described above, the Embodiment 1 has a vari-focal ratio of approximately 3 and nevertheless consists of eight lens elements, which number is smaller by three than the number of the lens elements required for composing the conventional vari-focal lens system. Further, the Embodiment 1 is designed as a compact vari-focal lens system having a short total length, i.e., a telephoto ratio of approximately 1.51 at the wide position thereof.

Figure 2:
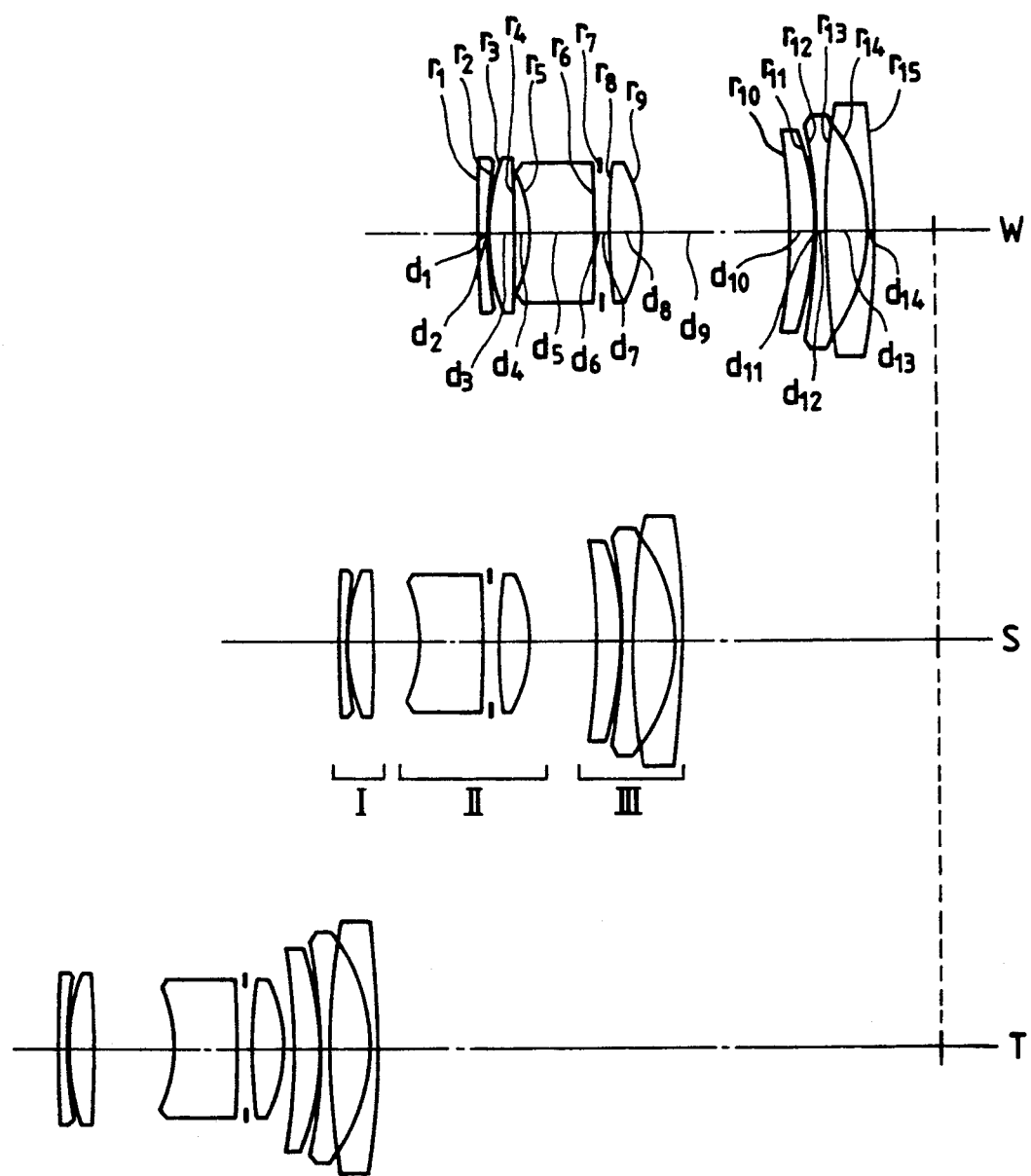

The Embodiment 2 has the composition illustrated in FIG. 2, wherein the vari-focal lens system according to the present invention comprises, in the order from the object side, a first lens unit I having a positive refractive power, a second lens unit II having a positive refractive power and a third lens unit III having a negative refractive power, and the lens element arranged at the image side location in the second lens unit is designed as the GRIN lens element satisfying the conditions (1) and (2).

In the Embodiment 2, the negative lens element arranged at the object side location in the second lens unit is also designed as a GRIN lens element and the second lens unit is composed only of these two GRIN lens elements, whereby the vari-focal lens system as a whole consists of seven lens elements and has a telephoto ratio of 1.47 at the wide position thereof.

The GRIN lens element arranged at the object side location in the second lens unit of the Embodiment 2 is made of a medium having a positive refractive power so that the positive refractive power of the second lens unit II is shared with the medium of the GRIN lens element. Further, a positive value is selected for the refractive power distribution coefficient Nz of the GRIN lens element arranged at the object side location so that spherical aberration is corrected favorably in the vari-focal lens system as a whole by producing positive spherical aberration by the medium of the GRIN lens element.

Figure 3:
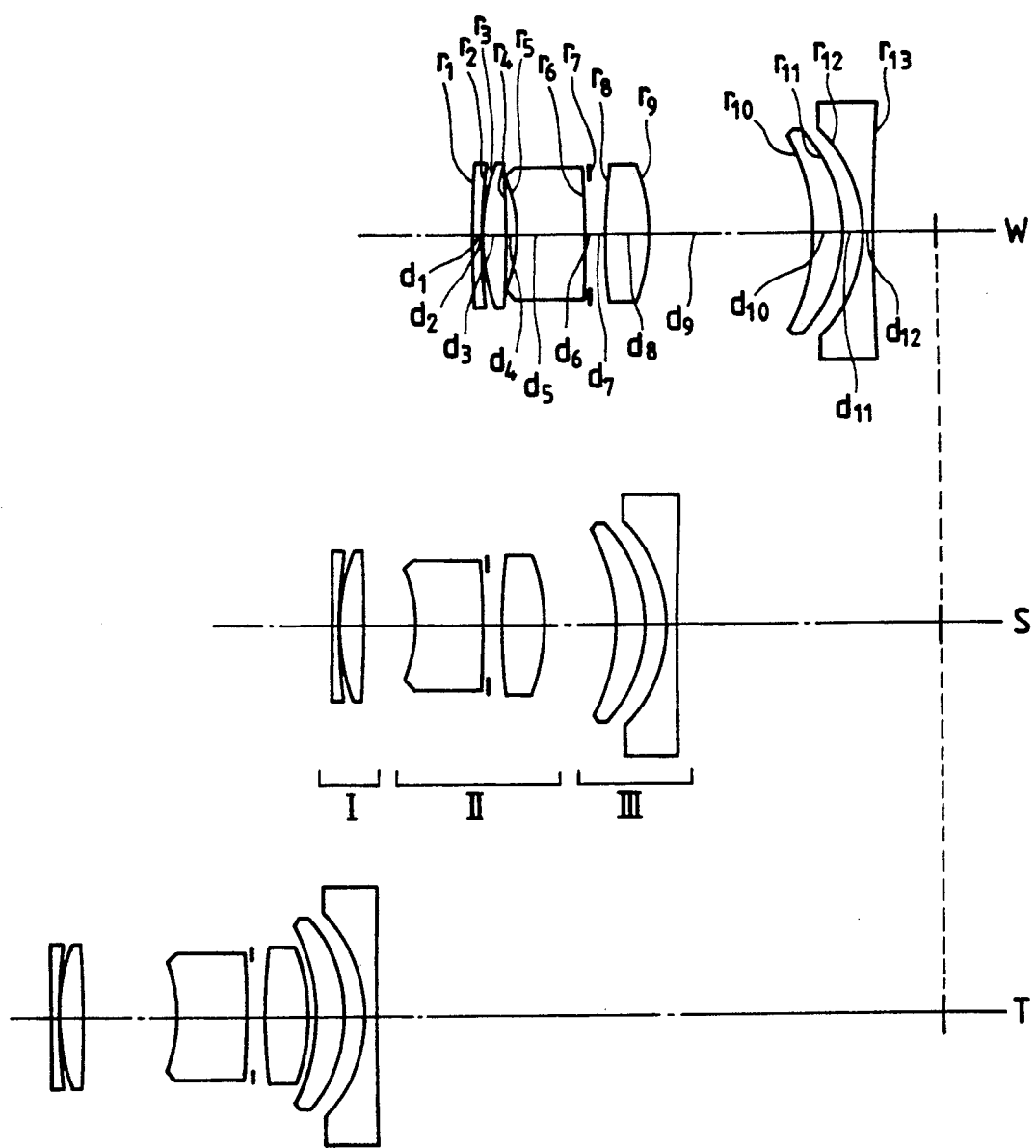

The Embodiment 3 has the composition shown in FIG. 3, wherein the vari-focal lens system according to the present invention comprises, in the order from the object side, a first lens unit I having a positive refractive power, a second lens unit II having a positive refractive power and a third lens unit III having a negative refractive power, and the lens element arranged at the image side location in the second lens unit is designed as the GRIN lens element satisfying the conditions (1) and (2).

In the Embodiment 3, as in the case of the Embodiment 2, the negative lens element arranged at the object side location in the second lens unit II is also designed as a GRIN lens element and the second lens unit II is composed only of the two GRIN lens elements. Further, the third lens unit is also composed of two lens elements, whereby the vari-focal lens system preferred as the Embodiment 3 as a whole consists of six lens elements. The Embodiment 3 consists of lens elements in a number equal to half the number of the lens elements required for composing the conventional vari-focal lens system and has a telephoto ratio of 1.54 at the wide position thereof.

In the Embodiment 3, the GRIN lens element arranged at the object side location in the second lens unit II is made of a medium having a positive refractive power and spherical aberration is corrected, differently from the case of the Embodiment 2, by lowering the image side surface of the second lens unit II.

Figure 4:
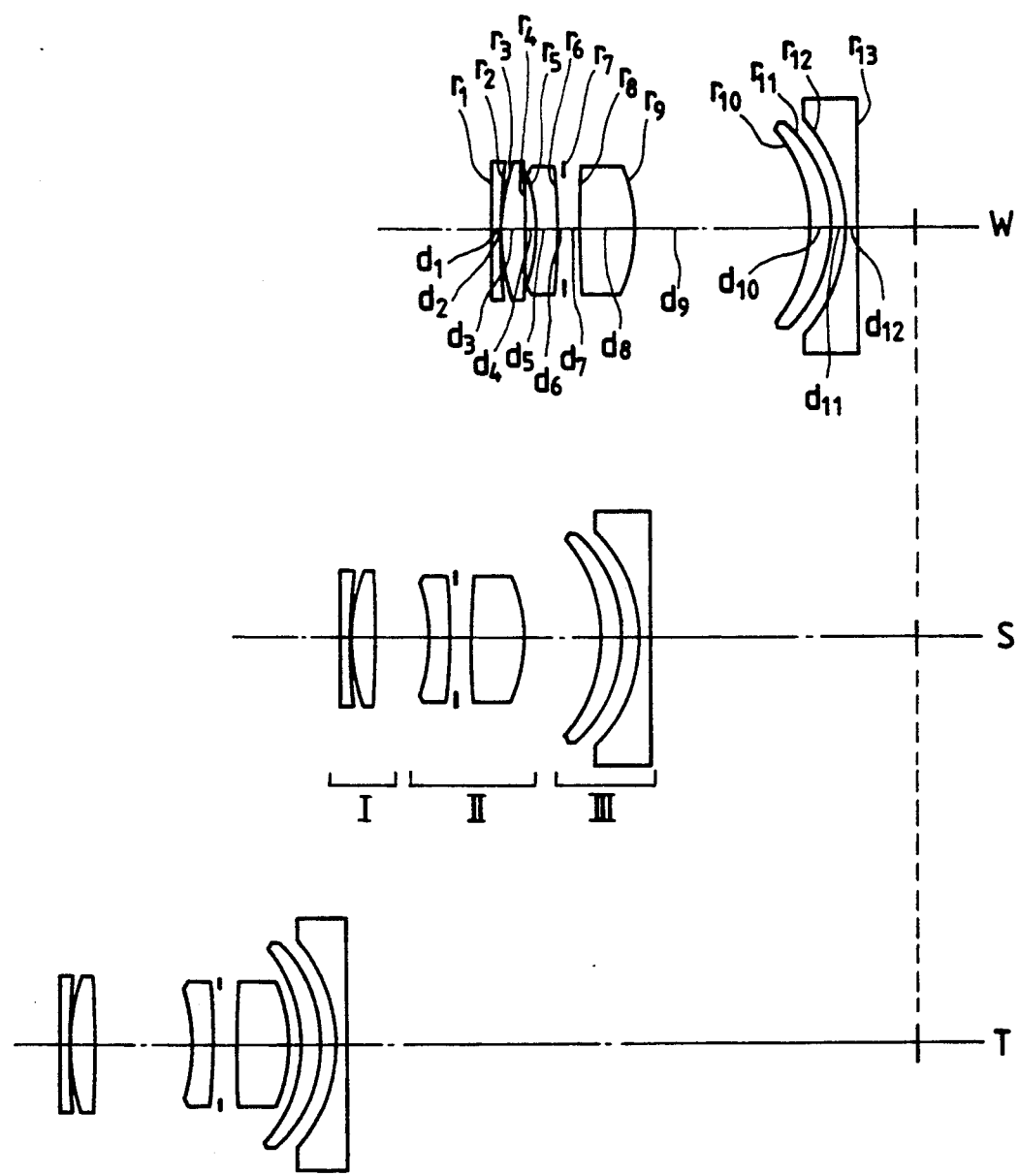

The Embodiment 4 has the composition illustrated in FIG. 4, wherein the vari-focal lens system according to the present invention comprises, in the order from the object side, a first lens unit I having a positive refractive power, a second lens unit II having a positive refractive power and a third lens unit III having a negative refractive power, and the lens element arranged at the image side location in the second lens unit II is designed as the GRIN lens element satisfying the conditions (1) and (2).

Like the Embodiment 3, the Embodiment 4 is designed as a vari-focal lens system consisting as a whole of six lens elements and so compact as to have a telephoto ratio of 1.38 at the wide position thereof.

In the Embodiment 4, the lens element arranged at the object side location in the second lens unit II is designed as a GRIN lens element which is made of a medium having a negative refractive power differently from the case of the Embodiment 3. This medium having the negative refractive power allows to lower curvature on the object side surface of the second lens unit II so as to reduce the angle of incidence of the offaxial ray, thereby correcting coma favorably. Though the positive refractive power of the second lens unit L becomes insufficient when said GRIN lens element is made of the medium having the negative refractive power, the insufficiency of the positive refractive power is compensated by thickening the GRIN lens element arranged at the image side location in the second lens unit II.

Figure 5:
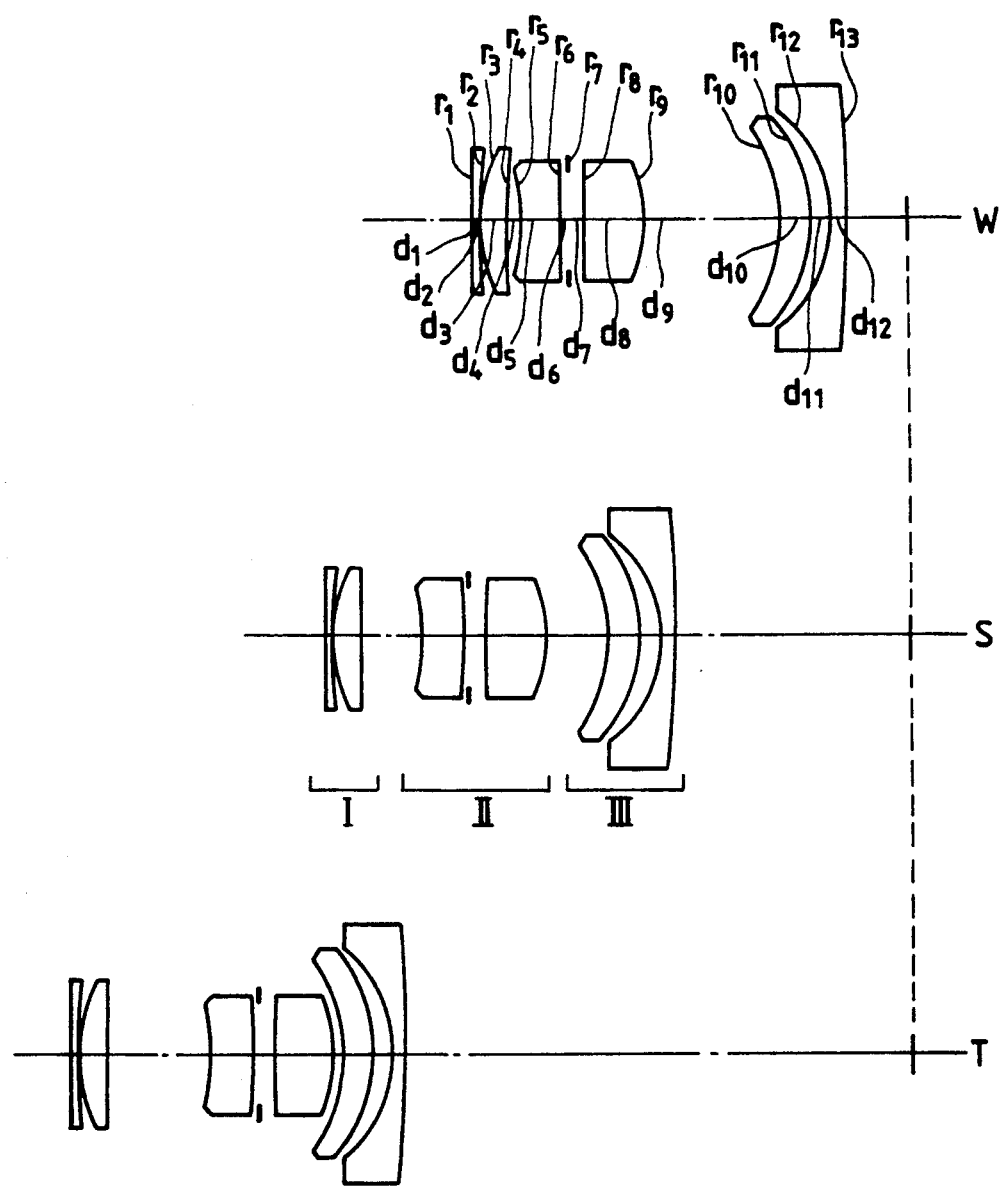

The Embodiment 5 has the composition shown in FIG. 5, wherein the vari-focal lens system according to the present invention comprises, in the order from the object side, a first lens unit I having a positive refractive power, a second lens unit II having a positive refractive power and a third lens unit III having a negative refractive power, and the lens element arranged at the image side location in the second lens unit II is designed as the GRIN lens element satisfying the conditions (1) and (2).

Like the Embodiment 4, the Embodiment 5 is designed as a vari-focal lens system consisting as a whole of six lens elements and so compact as to have a telephoto ratio of 1.37 at the wide position thereof. Further, the third lens unit III used in the Embodiment 5 consists of two lens elements and comprises an aspherical surface for obtaining a telephoto ratio of 0.96 at the tele position, in contrast to a telephoto ratio of 1.01 at the tele position of the Embodiment 4.

The aspherical surface used in the Embodiment 5 has a shape which weakens a negative refractive power as the portions of said aspherical surface are farther from the optical axis, and serves for favorably correcting the positive distortion produced especially at the wide position and coma over the entire vari-focal range.

When the direction of the optical axis is taken as the x axis and the direction perpendicular to the optical axis is taken as the y axis, the shape of the aspherical surface is expressed by the formula shown below:

$$x = \frac{y^2/r}{1 + \sqrt{1 - p(y/r)^2}} + \sum_{i=2}^{n} A_{2i} y^{2i}$$

wherein the reference symbol r represents the radius of curvature on the reference sphere of said aspherical surface, the reference symbol p designates the conical constant and the reference symbol $A_{2i}$ denotes the aspherical surface coefficient.

The GRIN lens element used as the negative lens element arranged at the object side location in the second lens unit II of the Embodiment 5 has the same functional effect as that of the GRIN lens element used in the Embodiment 4.

Figure 6:
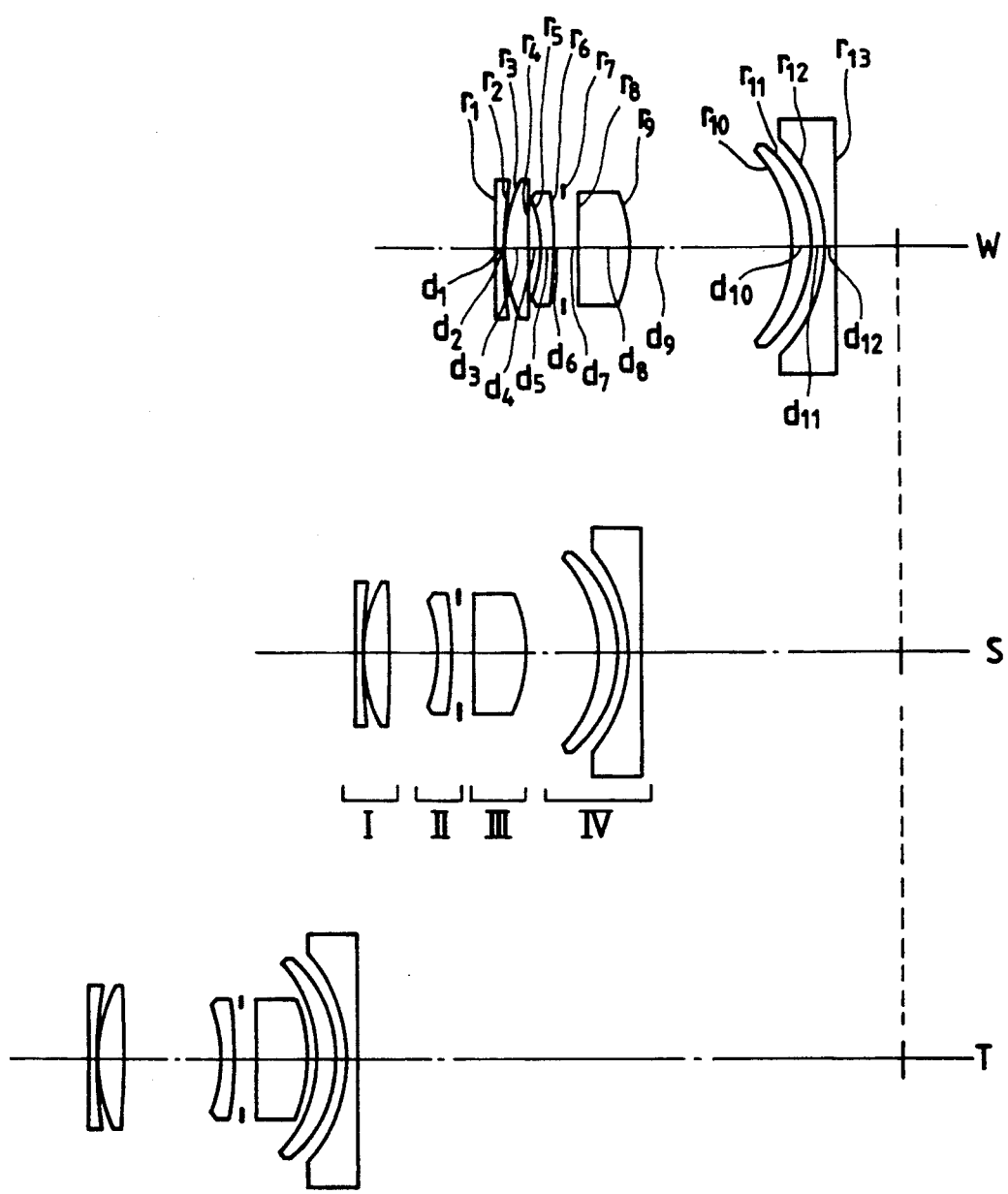
Figure 7:
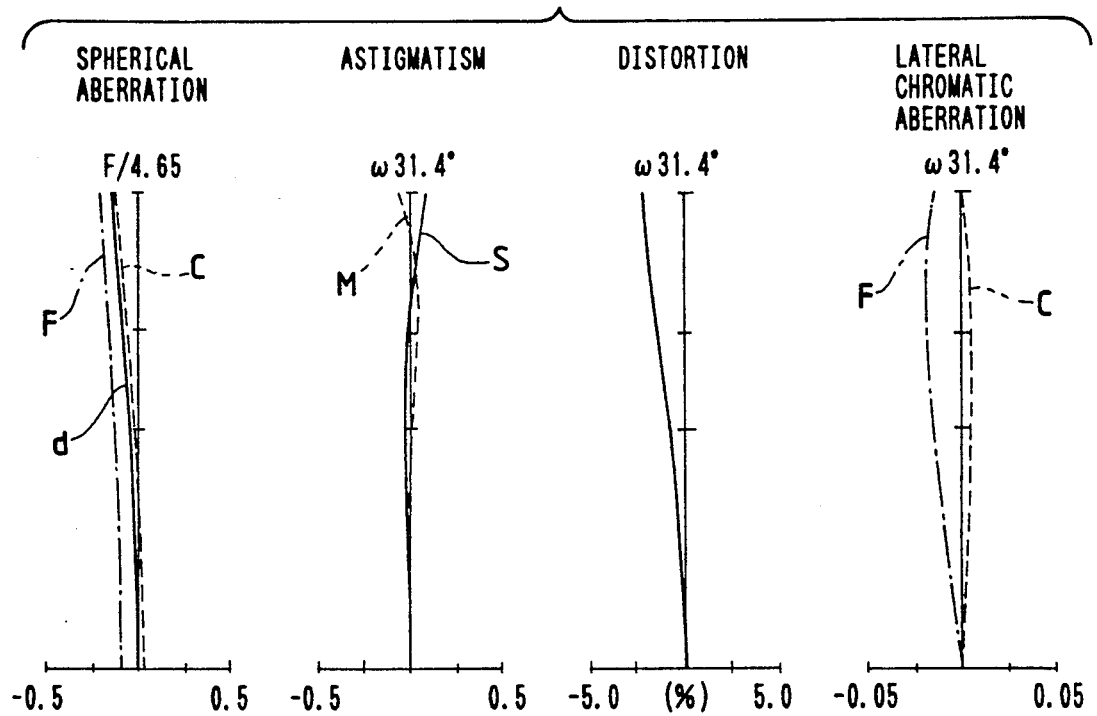
FIG. 7, FIG. 8 and FIG. 9 show graphs illustrating aberration characteristics at the wide position, intermediate focal length and tele position respectively of the Embodiment 1 of the present invention.
Figure 8:
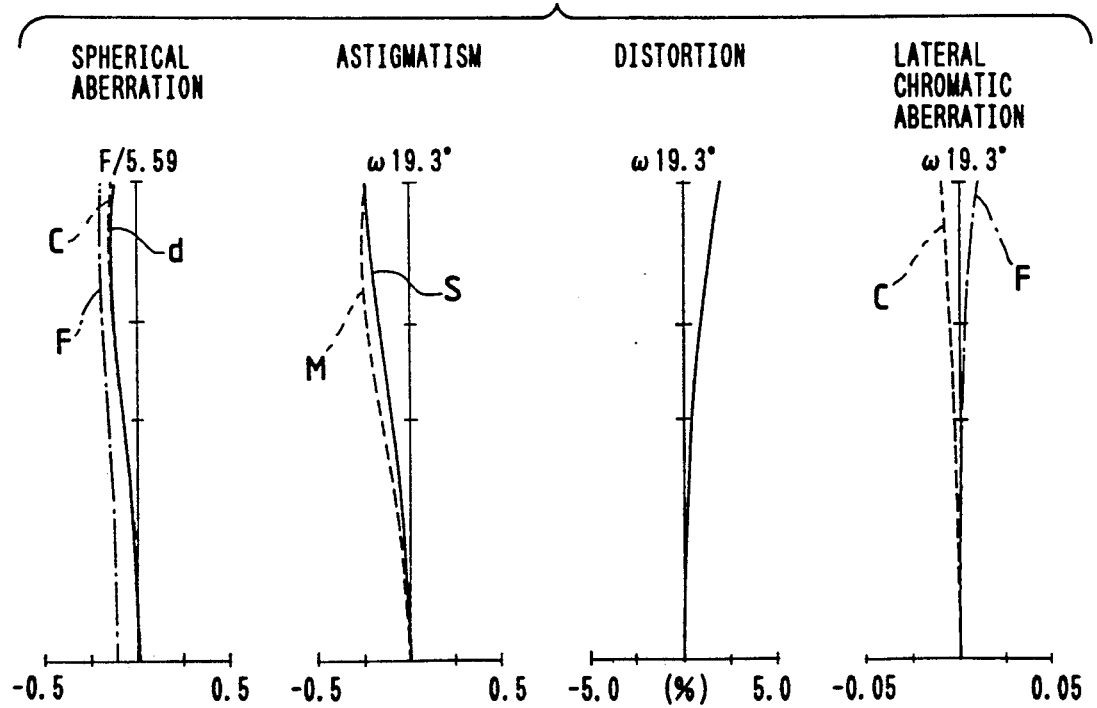
Figure 9:
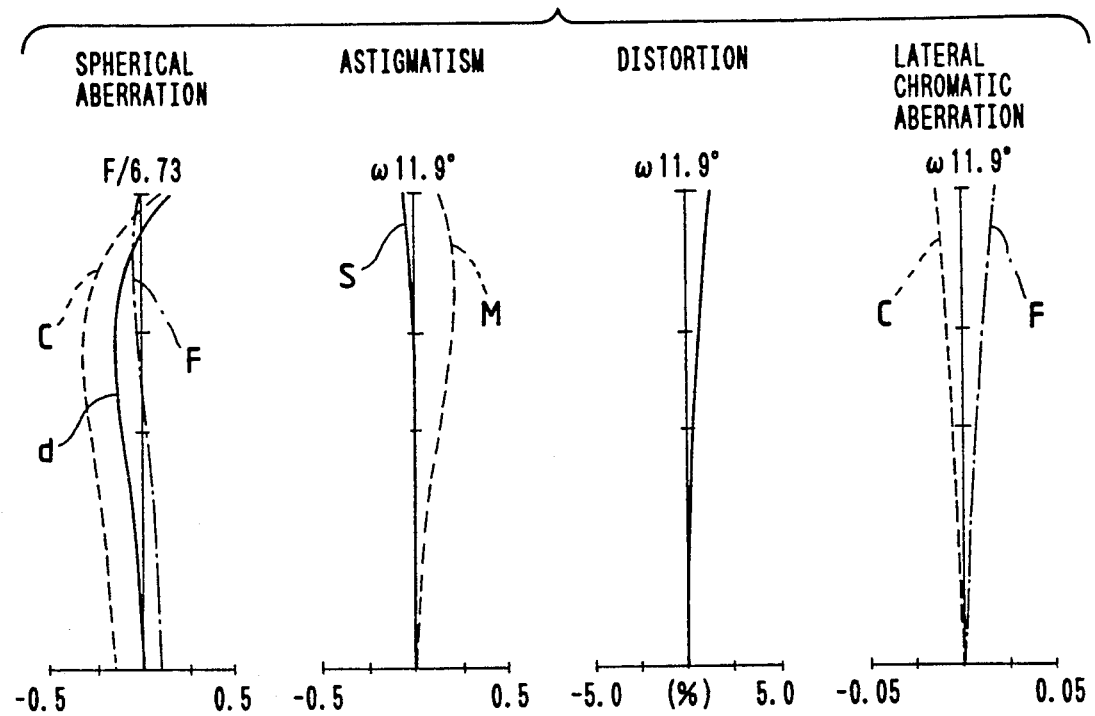
Figure 10:
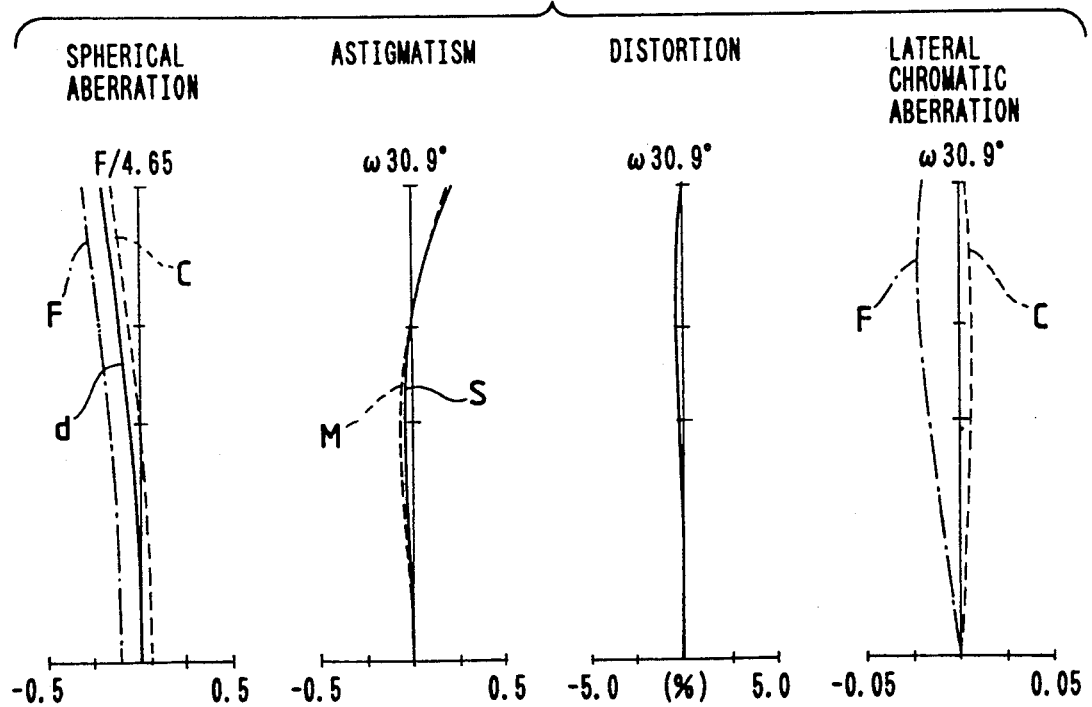
FIG. 10, FIG. 11 and FIG. 12 show graphs illustrating aberration characteristics at the wide position, intermediate focal length and tele position respectively of the Embodiment 2 of the present invention.
Figure 11:
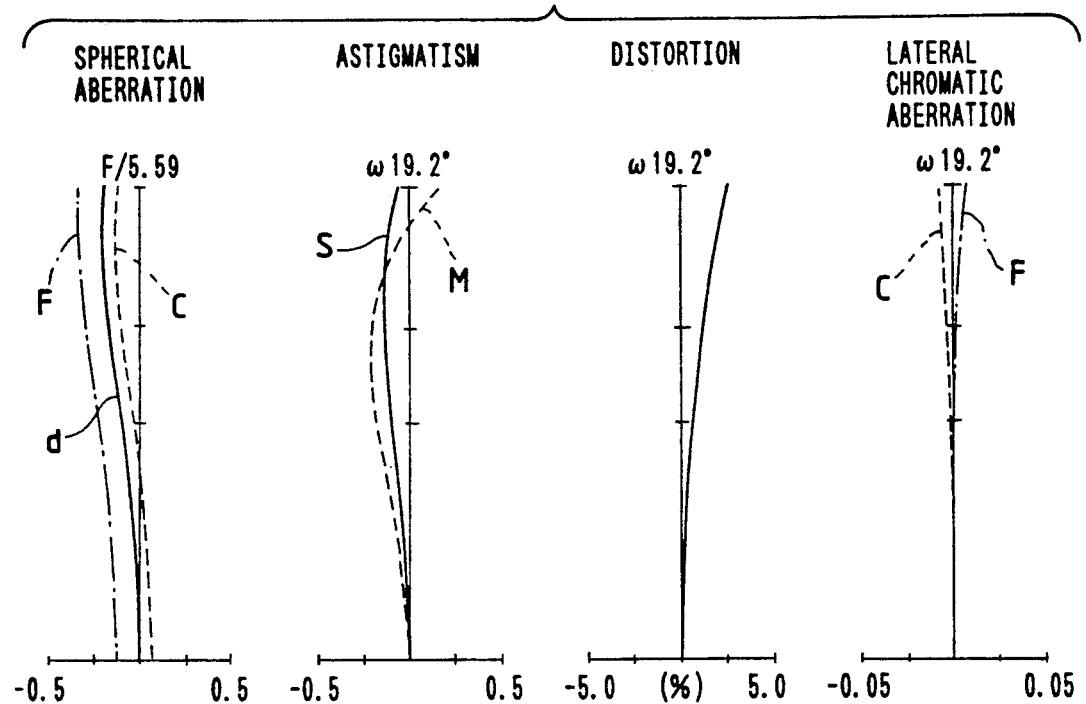
Figure 12:
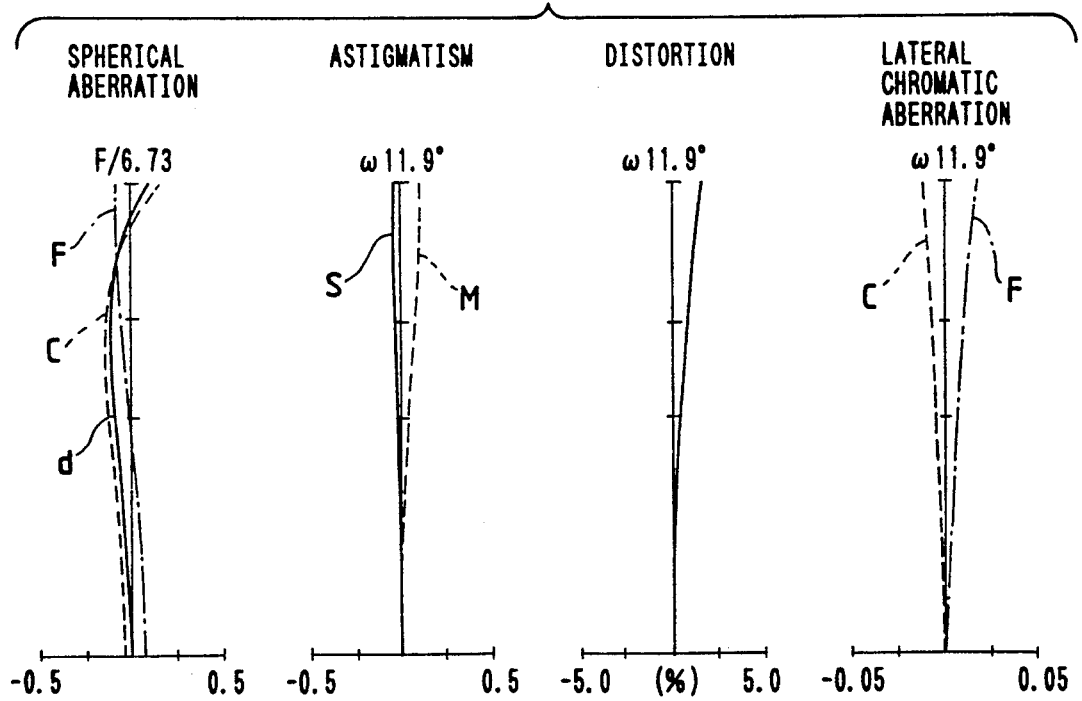
Figure 13:
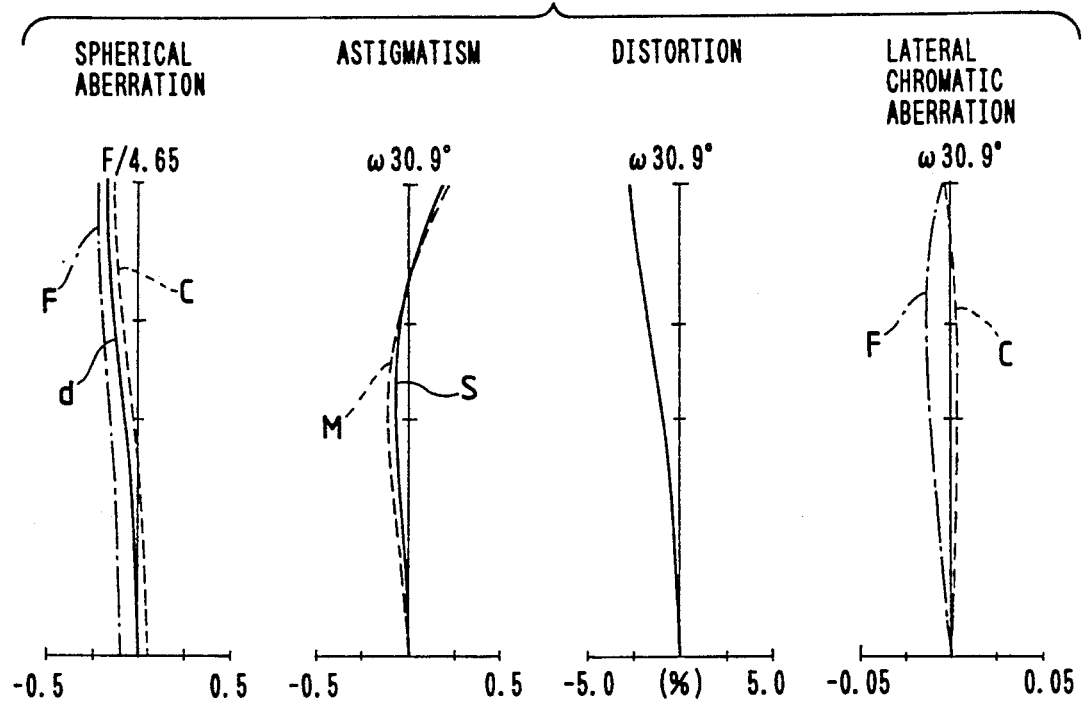
FIG. 13, FIG. 14 and FIG. 15 show curves illustrating aberration characteristics at the wide position, intermediate focal length and tele position respectively of the Embodiment 3 of the present invention.
Figure 14:
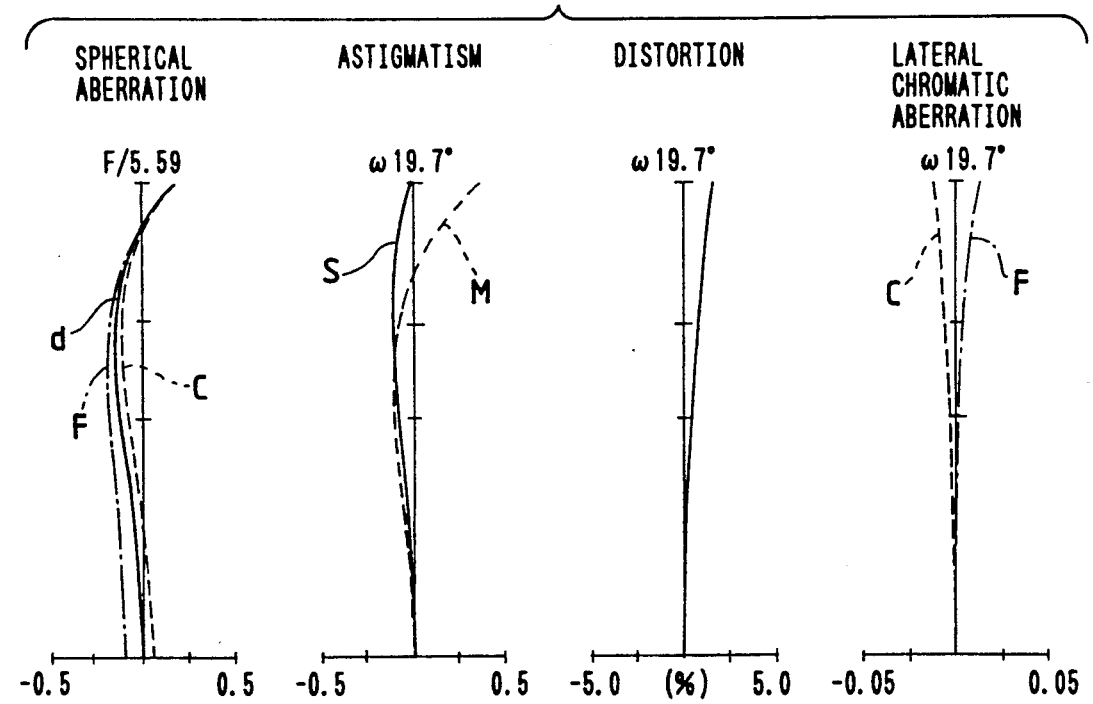
Figure 15:
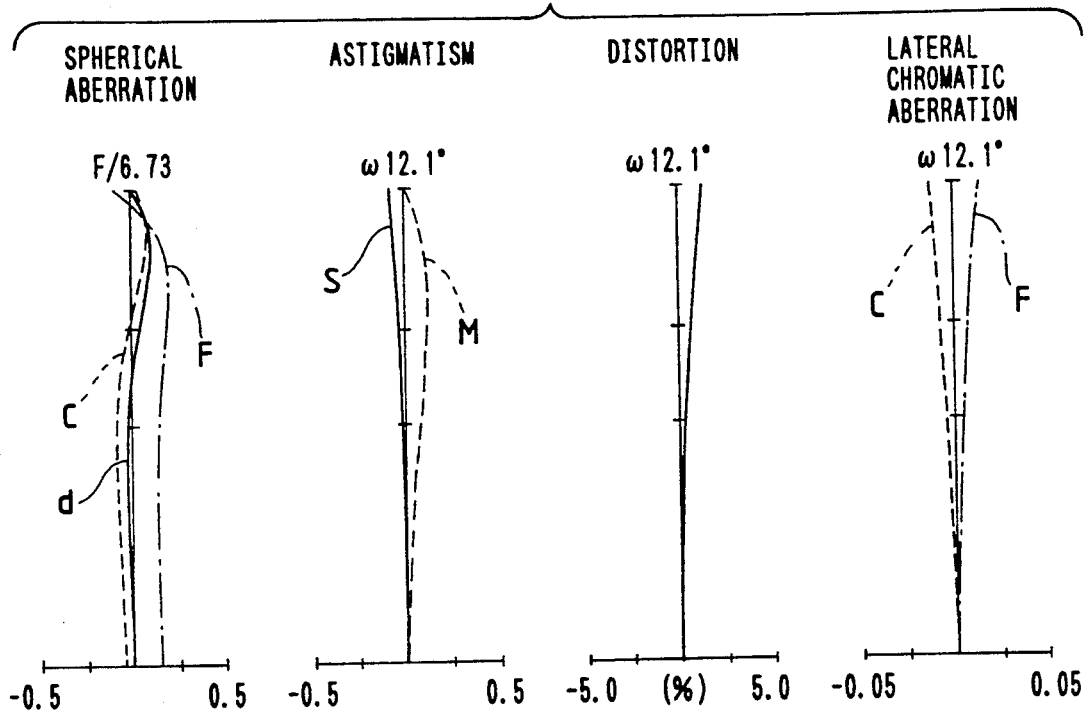
Figure 16:
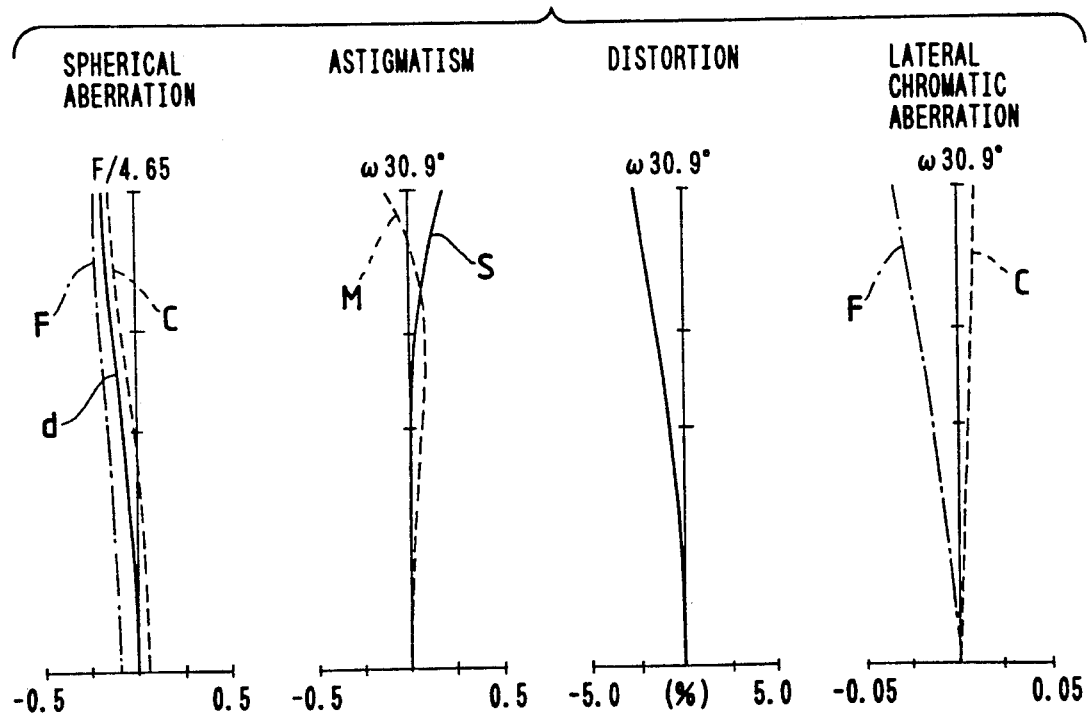
FIG. 16, FIG. 17 and FIG. 18 show curves illustrating aberration characteristics at the wide position, intermediate focal length and tele position respectively of the Embodiment 4 of the present invention.
Figure 17:
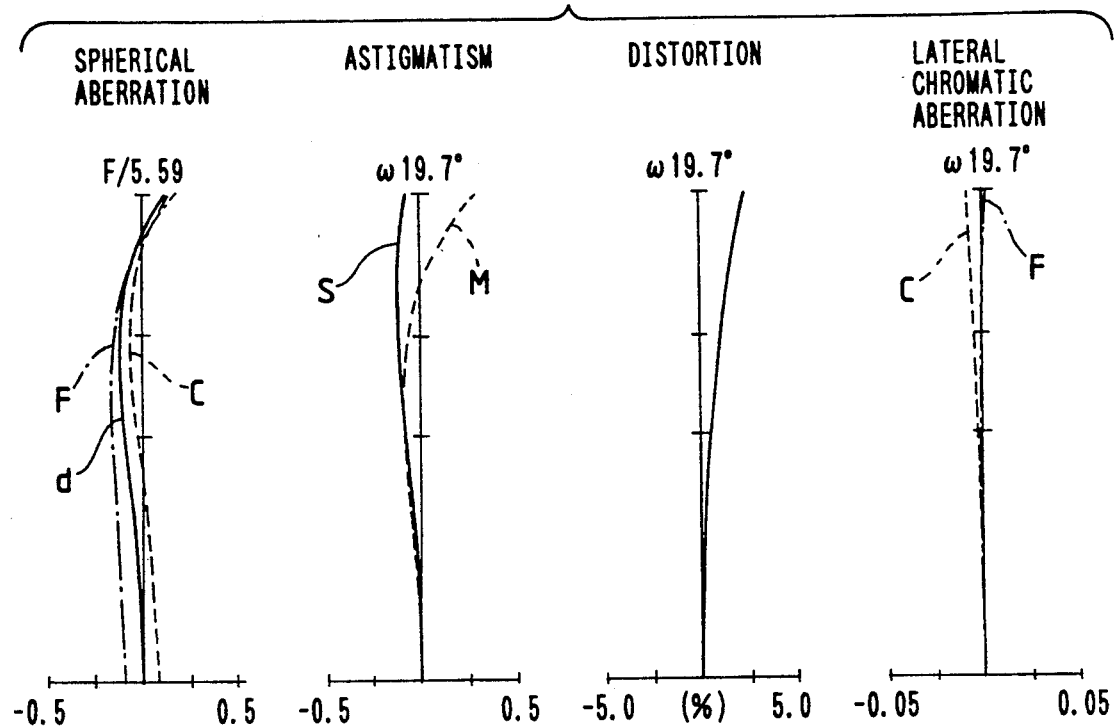
Figure 18:
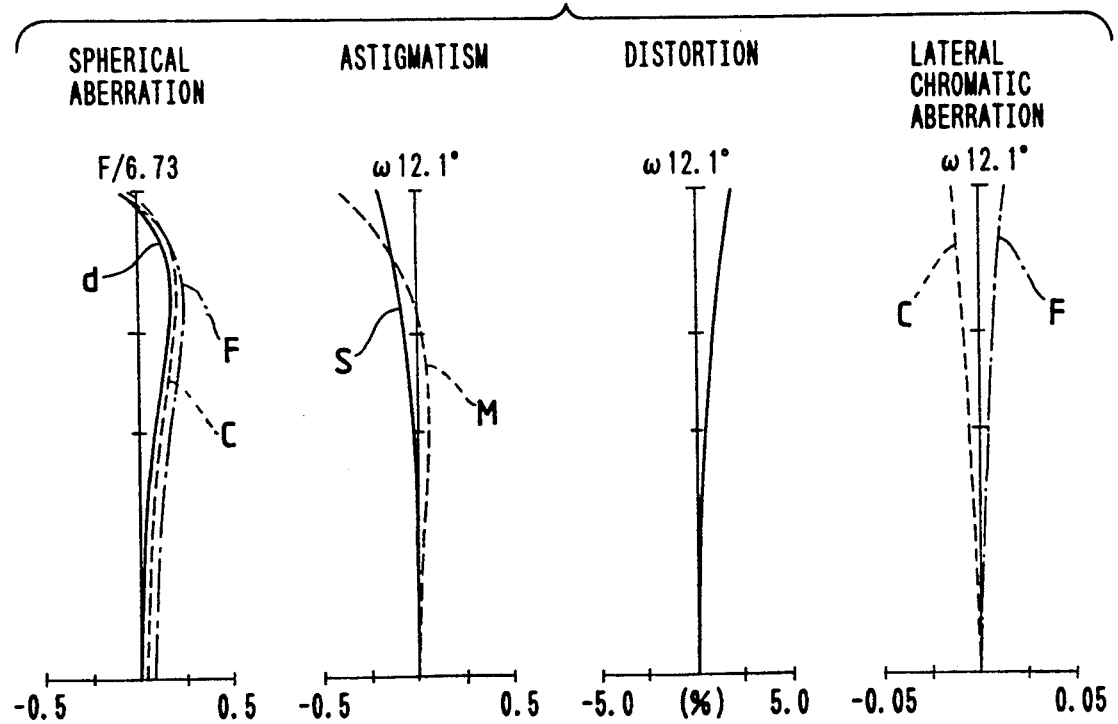
Figure 19:
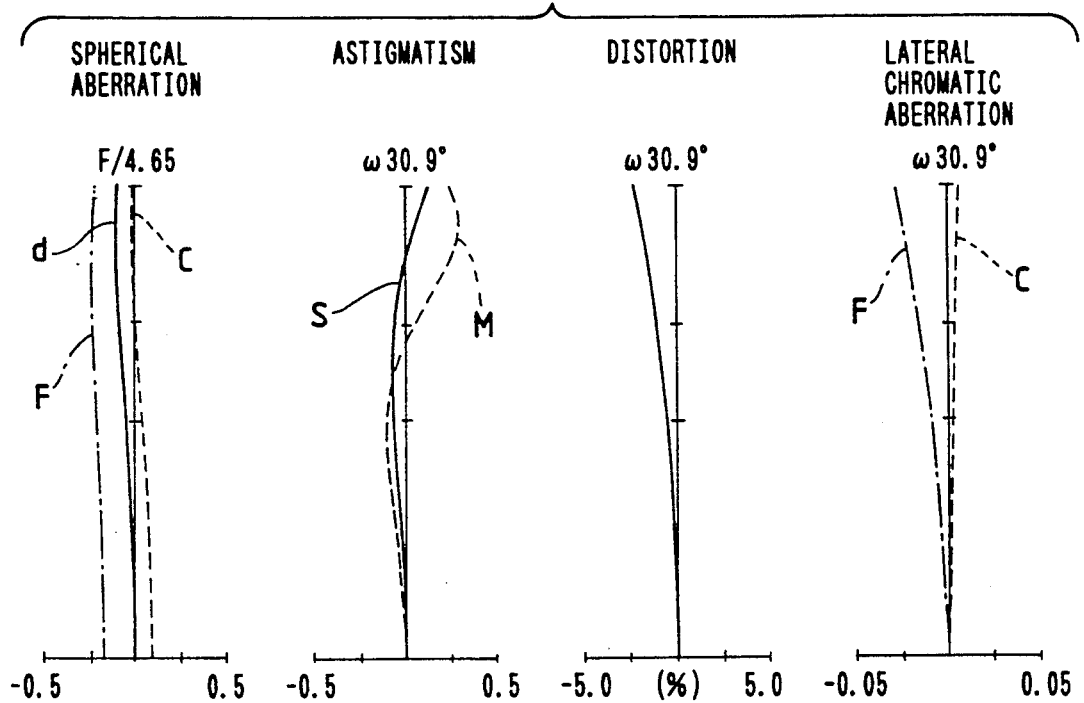
FIG. 19, FIG. 20 and FIG. 21 show graphs visualizing aberration characteristics at the wide position, intermediate focal length and tele position respectively of the Embodiment 5 of the present invention.
Figure 20:
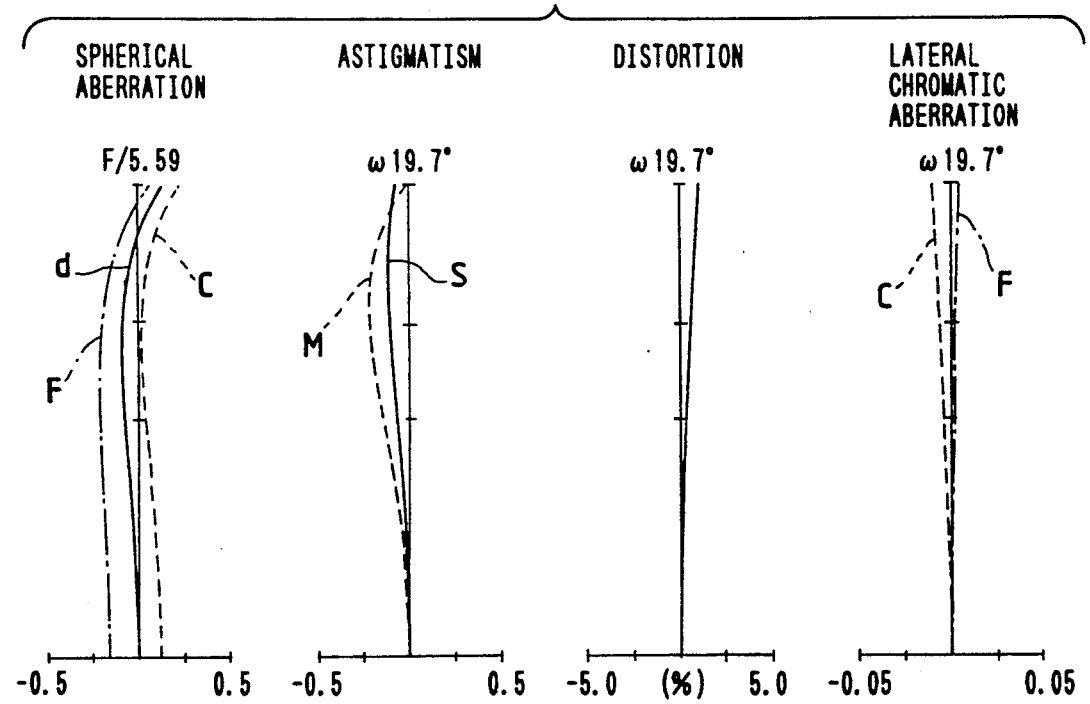
Figure 21:
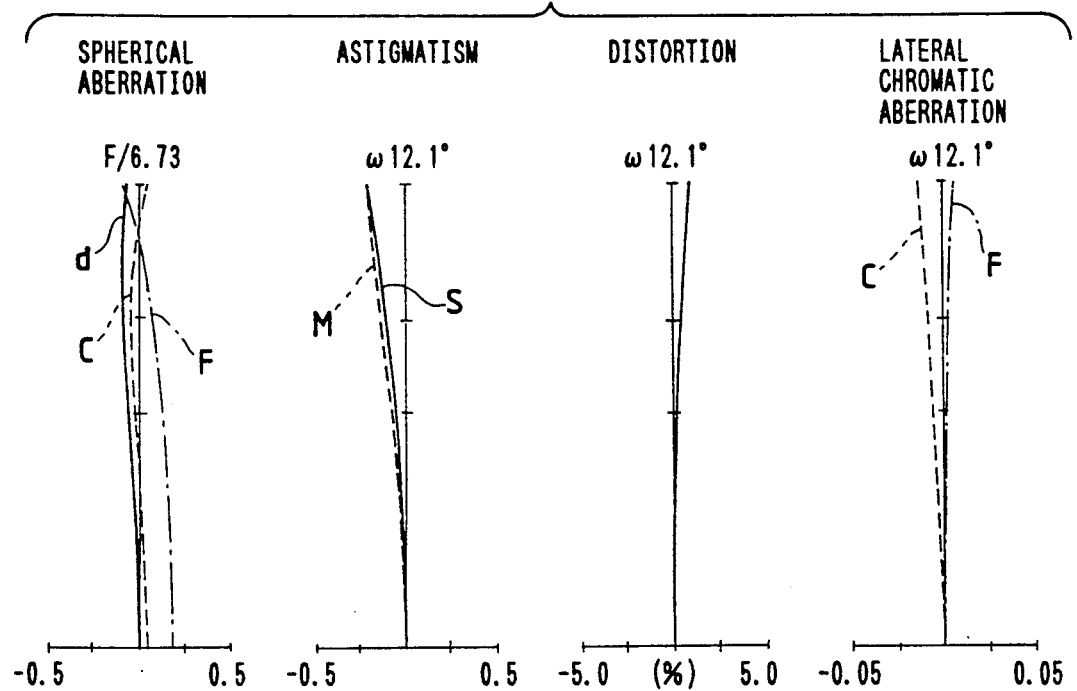
Figure 22:
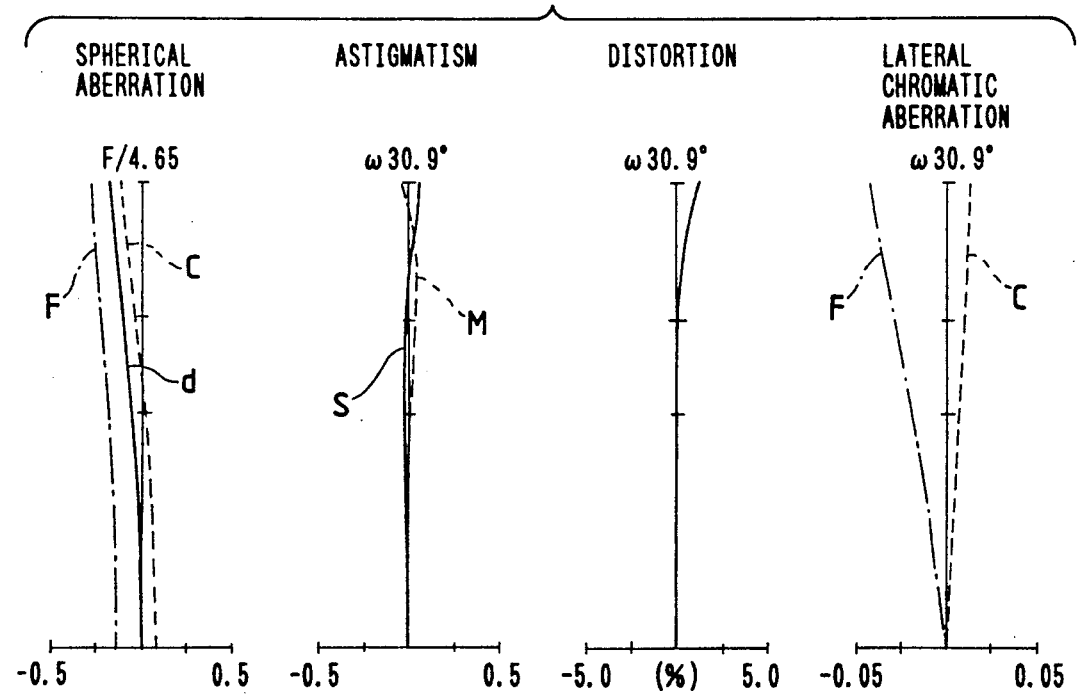
FIG. 22, FIG. 23 and FIG. 24 show curves visualizing aberration characteristics at the wide position, intermediate focal length and tele position respectively of the Embodiment 6 of the present invention.
Figure 23:
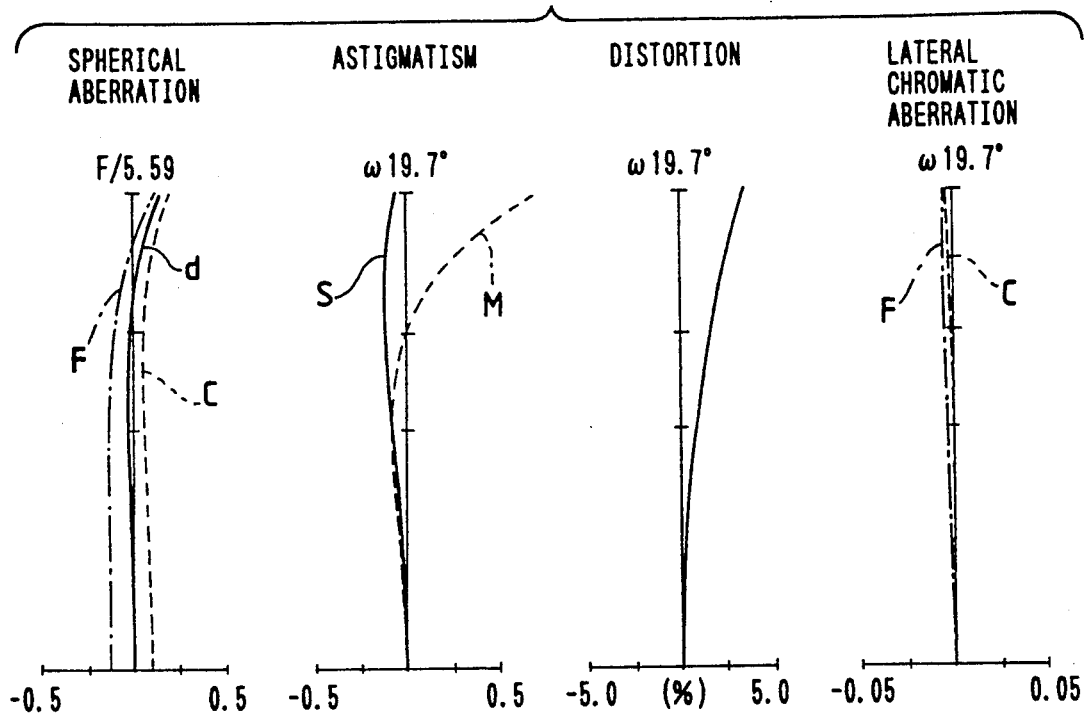
Figure 24:
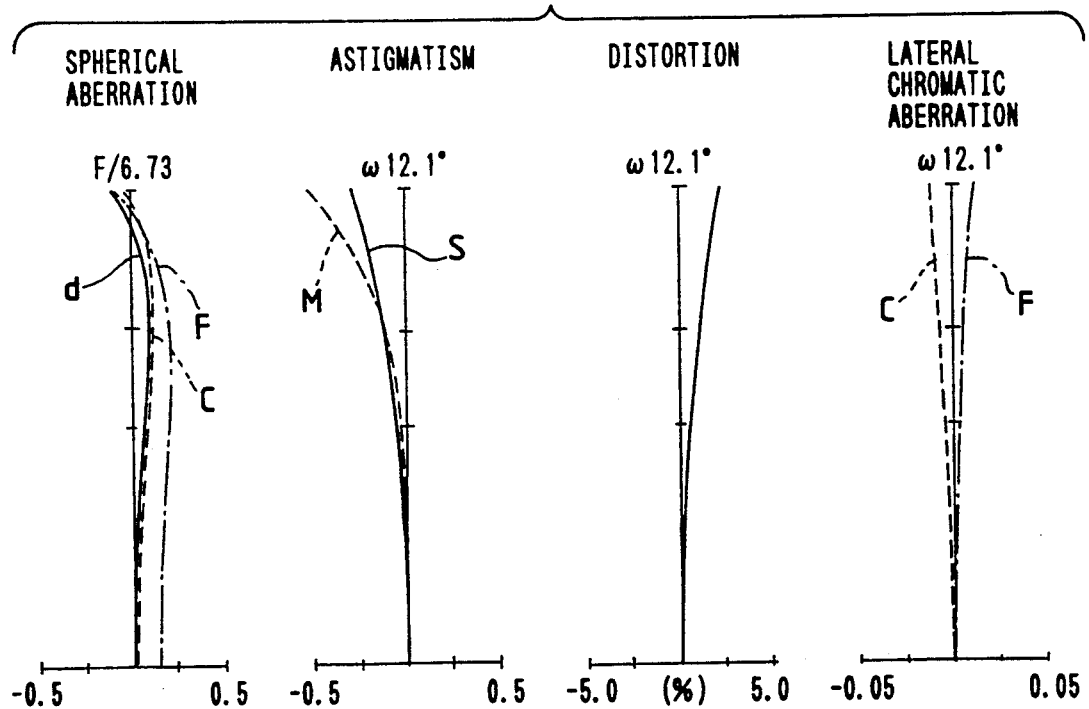

The Embodiment 6 has the composition illustrated in FIG. 6, wherein the lens unit having a positive refractive power, which corresponds to the second lens unit of the other embodiments, is divided, in the order from the object side, into a lens unit having a negative refractive power and another lens unit having a positive refractive power, and the vari-focal lens system according to the present invention consists of four lens units. Speaking more concretely, the vari-focal lens system preferred as the Embodiment 6 comprises, in the order from the object side, a first lens unit I having a positive refractive power, a second lens unit II having a negative refractive power, a third lens unit III having a positive refractive power and a fourth lens unit IV having a negative refractive power.

In the Embodiment 6, the third lens unit III having the positive refractive power, out of the lens units which correspond to the second lens unit II in each of the Embodiments 1 through 5, is composed of a single GRIN lens element satisfying the conditions (1) and (2).

Since the freedom for correction of aberrations can be enhanced by composing the vari-focal lens system according to the present invention of the four lens units, the Embodiment 6 is designed as a vari-focal lens system which consists of six lens elements having no aspherical surface, and is so compact as to have a telephoto ratio of 1.30 at the wide position and a telephoto ratio of 0.95 at the tele position.

Further, in the Embodiment 6, the second lens unit II also uses a GRIN lens element which has the same functional effect as that of the GRIN lens element arranged at the object side location in the second lens unit of the Embodiment 4.

As is understood from the foregoing description, the vari-focal lens system according to the present invention consists of three positive, positive and negative lens units or four positive, negative, positive and negative lens units, and uses at least one GRIN lens element in the second positive lens unit of the three lens units or in the third positive lens unit of the four lens units, whereby the vari-focal lens system has a vari-focal ratio of 3 or higher, aberrations corrected favorably over the entire vari-focal range from the wide position to the tele position and a short total length, and consists of a small number of lens elements.

I claim:

1. A vari-focal lens system comprising, in the order from the object side, a first lens unit having a positive refractive power, a second lens unit having a positive refractive power and a third lens unit having a negative refractive power, and using, in said second lens unit, at least one graded refractive index lens element having a refractive index distribution in the direction perpendicular to the optical axis.

2. A vari-focal lens system according to claim 1 wherein said graded refractive index lens element is arranged at the image side location in the second lens unit, has a refractive index distribution expressed by the formula shown below and satisfies the following condition 1:

$$n(r) = N_0 + N_1 r^2 + N_2 r^4 + N_3 r^6 + \ldots$$
$$N_{1(2)} < 0 \tag{1}$$

wherein the reference symbol $N_0$ represents the refractive index of said graded refractive index lens element for the ray having the standard wavelength as measured on the optical axis, the reference symbol r designates the distance as measured from the optical axis to a portion of interest of said graded refractive index lens element in the radial direction, the reference symbol n(r) denotes the refractive index of said graded refractive index lens element as measured at the portion located at the radial distance of r, the reference symbols $N_1$, $N_2$, $N_3$, ... represent the refractive index distribution coefficients of the second, fourth, sixth, ... orders respectively for the ray having the standard wavelength, and the reference symbol $N_{1(2)}$ designates the refractive index distribution coefficient of the second order of the graded refractive index lens element arranged at the image side location in the second lens unit.

3. A vari-focal lens system according to claim 2 wherein the graded refractive index lens element arranged at the image side location in the second lens unit further satisfies the following condition (2):

$$K \cdot N_{2(1)} < 0 \tag{2}$$

wherein the reference symbol $N_{2(1)}$ represents the refractive index distribution coefficient of the fourth order of said graded refractive index lens element, and the reference symbol k designates a constant having a value of $+1$ when either of the surfaces of said graded refractive index lens element whichever has the higher curvature is convex or a value of $-1$ when either of the surfaces of said graded refractive index lens element whichever has the higher curvature is concave.

4. A vari-focal lens system according to claim 3 wherein the lens element arranged at the object side location in the second lens unit is also a graded refractive index lens element.

5. A vari-focal lens system according to claim 1, wherein said first lens unit consists of two lens elements including at least one positive lens element.

6. A vari-focal lens system according to claim 1, wherein said first lens unit consists of two lens elements including at least one negative lens element.

7. A vari-focal lens system according to claim 1, wherein said first lens unit consists of a positive lens element and a negative lens element.

8. A vari-focal lens system according to claim 5, 6 or 7, wherein an airspace disposed between the two lens elements of said first lens unit is narrower as measured on the optical axis than as measured off the optical axis.

9. A vari-focal lens system comprising, in the order from the object side, a first lens unit having a positive refractive power, a second lens unit having a negative refractive power, a third lens unit having a positive refractive power and a fourth lens unit having a negative refractive power, and uses, in said third lens unit, at least one graded refractive index lens element having a refractive index distribution in the direction perpendicular to the optical axis.

10. A vari-focal lens system according to claim 9 wherein said graded refractive index lens element is arranged at the image side location in the third lens unit, has a refractive index distribution expressed by the formula shown below and satisfies the following condition 1:

$$N(r) = N_0 + N_1 r^2 + N_2 r^4 + N_3 r^6 + \ldots$$
$$N_{1(2)} < 0 \tag{1}$$

wherein the reference symbol N represents the refractive index of said graded refractive index lens element for the ray having the standard wavelength as measured on the optical axis, the reference symbol r designates the distance as measured from the optical axis to a portion of interest of said graded refractive index lens element in the radial direction, the reference symbol n(r) denotes the refractive index of said graded refractive index lens element as measured at the portion located at the radial distance of r, the reference symbols $N_1$, $N_2$, $N_3$, . . . represent the refractive index distribution coefficients of the second, fourth, sixth, . . . orders respectively for the ray having the standard wavelength, and the reference symbol $N_{1(2)}$ designates the refractive index distribution coefficient of the second order of the graded refractive index lens element arranged at the image side location in the third lens unit.

11. A vari-focal lens system according to claim 10 wherein the graded refractive index lens element arranged at the image side location in the third lens unit further satisfies the following condition (2):

$$k \cdot N_{2(1)} < 0 \tag{2}$$

wherein the reference symbol $N_{2(1)}$ represents the refractive index distribution coefficient of the fractive index distribution coefficient of the fourth order of said graded refractive index lens element, and the reference symbol k designates a constant having a value of $+1$ when either of the surfaces of said graded refractive index lens element whichever has the higher curvature is convex or a value of $-1$ when either of the surfaces of said graded refractive index lens element whichever has the higher curvature is concave.

12. A vari-focal lens system according to claim 11 wherein the lens element arranged at the object side location in the third lens unit is also a graded refractive index lens element.

13. A vari-focal lens system comprising:
a first lens unit having a positive refractive power;
a second lens unit having a positive refractive power; and
a third lens unit having a negative refractive power;
wherein said first lens unit consists of two lens elements disposed with an airspace reserved therebetween; and
wherein focal length of said vari-focal lens system is varied by moving each of said lens units along an optical path of said vari-focal lens system;
wherein said second lens unit consists of two lens elements.

14. A vari-focal lens system according to claim 13, wherein each of said first and second lens units consists of positive lens element and a negative lens element.

15. A vari-focal lens system according to claim 13, wherein third lens unit consists of three lens elements.

16. A vari-focal lens system according to claim 13, wherein said third lens unit consists of a positive lens element and two negative lens elements.

17. A vari-focal lens system comprising:
a first lens unit having a positive refractive power;
a second lens unit having a positive refractive power; and
a third lens unit having a negative refractive power;
wherein said first lens unit consists of two lens elements disposed with an airspace reserved therebetween; and
wherein focal length of said vari-focal lens system is varied by moving each of said lens units along an optical path of said vari-focal lens system;
wherein said second lens unit and said third lens unit each consist of two lens elements.

18. A vari-focal lens system according to claim 17, wherein each of said first, second and third lens units consists of a positive lens element and a negative lens element.

19. A vari-focal lens system comprising:
a first lens unit having a positive refractive power;
a second lens unit having a positive refractive power; and
a third lens unit having a negative refractive power;
wherein said first lens unit consists of two lens elements disposed with an airspace reserved therebetween;
wherein focal length of said vari-focal lens system is varied by moving each of said lens units along an optical path of said vari-focal lens system; and
wherein said second lens unit consists of three lens elements.

20. A vari-focal lens system according to claim 19, wherein said first lens unit consists of a positive lens element and a negative lens element, and said second lens unit consists of two positive lens elements and a negative lens element.

21. A vari-focal lens system according to claim 19 or 20, wherein said third lens unit consists of a positive lens element and two negative lens elements.

22. A vari-focal lens system according to claim 19 or 20, wherein said third lens unit consists of a positive lens element and a negative lens element.

23. A vari-focal lens system consisting of:
a first lens unit having a positive refractive power;
a second lens unit having a negative refractive power;
a third lens unit having a positive refractive power; and
a fourth lens unit having a negative refractive power;
wherein said first lens unit consists of two lens elements; and
wherein focal length of said vari-focal lens system is varied from a wide position to a tele position by moving at least said second lens unit toward the object side.

24. A vari-focal lens system according to claim 23, wherein said second lens unit and said third lens unit each consist of a single lens element.

25. A vari-focal lens system according to claim 24, wherein said second lens unit consists of a single negative lens element and said third lens unit consists of a single positive lens element.

26. A vari-focal lens system according to claim 23, 24, or 25 wherein said first lens unit consists of two lens elements and said fourth lens unit consists of two lens elements.

27. A vari-focal lens system according to claim 26, wherein said first lens unit consists of a positive lens element and a negative lens element, and said fourth lens unit consists of a positive lens element and a negative lens element.

28. A vari-focal lens system consisting of:
a first lens unit having a positive refractive power;
a second lens unit having a negative refractive power;
a third lens unit having a positive refractive power; and
a fourth lens unit having a negative refractive power;
wherein said first lens unit consists of two lens elements disposed with an airspace therebetween; and
wherein focal length of said vari-focal system is varied from a wide position to a tele position by moving each of said lens units toward the object side.

29. A vari-focal lens system according to claim 23 or 28, wherein said first lens unit consists of a negative lens element and a positive lens element disposed in this order from the object side.

30. A vari-focal lens system according to claim 23 or 28, wherein an airspace is reserved between the two lens elements of said first lens unit, said airspace being narrower as measured on the optical axis than as measured off the optical axis.

31. A vari-focal lens system comprising:
a first lens unit having a positive refractive power;
a second lens unit having a negative refractive power;
a third lens unit having a positive refractive power; and
a fourth lens unit having a negative refractive power;
wherein said first lens unit consists of a negative front subunit and a positive rear subunit; and
wherein focal length of said vari-focal lens system is varied by moving at least said second lens unit toward the object side.

32. A vari-focal lens system comprising:
a first lens unit having a positive refractive power;
a second lens unit having a negative refractive power;
a third lens unit having a positive refractive power; and
a fourth lens unit having a negative refractive power;
wherein said first lens unit consists of a negative front subunit and a positive rear subunit; and
wherein focal length of said vari-focal lens system is varied from a wide position to a tele position thereof by moving each of said lens units toward the object side.

* * * * *